United States Patent
Mercer et al.

(10) Patent No.: US 11,960,146 B2
(45) Date of Patent: Apr. 16, 2024

(54) FITTING OF GLASSES FRAMES INCLUDING LIVE FITTING

(71) Applicant: Ditto Technologies, Inc., Oakland, CA (US)

(72) Inventors: Cliff Mercer, Palo Alto, CA (US); Ebube Anizor, Oakland, CA (US); Tenzile Berkin Cilingiroglu, Fremont, CA (US); Trevor Noel Howarth, San Francisco, CA (US)

(73) Assignee: DITTO TECHNOLOGIES, INC., Oakland, CA (US)

( * ) Notice: Subject to any disclaimer, the term of this patent is extended or adjusted under 35 U.S.C. 154(b) by 0 days.

(21) Appl. No.: 17/180,541

(22) Filed: Feb. 19, 2021

(65) Prior Publication Data
US 2021/0264684 A1 Aug. 26, 2021

Related U.S. Application Data
(60) Provisional application No. 62/979,968, filed on Feb. 21, 2020.

(51) Int. Cl.
*G06T 15/00* (2011.01)
*G02C 13/00* (2006.01)
*G06T 7/55* (2017.01)
*G06T 7/73* (2017.01)
*G06T 7/80* (2017.01)
(Continued)

(52) U.S. Cl.
CPC .............. *G02C 13/003* (2013.01); *G06T 7/55* (2017.01); *G06T 7/73* (2017.01); *G06T 7/80* (2017.01); *G06T 11/60* (2013.01); *G06T 19/20* (2013.01); *G06V 10/751* (2022.01); *G06V 40/171* (2022.01); *G06T 2207/10024* (2013.01); *G06T 2207/10028* (2013.01); *G06T 2207/30201* (2013.01); *G06T 2219/2016* (2013.01)

(58) Field of Classification Search
CPC ......... G06T 19/00; G06T 17/20; G06T 17/00; G06T 15/10; G06T 15/00
USPC ........................................................... 345/419
See application file for complete search history.

(56) References Cited

U.S. PATENT DOCUMENTS

| 4,845,641 A | 7/1989 | Ninomiya |
| 5,617,155 A | 4/1997 | Ducarouge |

(Continued)

FOREIGN PATENT DOCUMENTS

KR  20050057586  6/2005

OTHER PUBLICATIONS

Author Unknown, Tracking and Visualizing Faces, Apple Developer Documentation, downloaded Feb. 11, 2021.
(Continued)

*Primary Examiner* — Gordon G Liu
(74) *Attorney, Agent, or Firm* — H&I PARTNERS; Chai Im; C. Andrew Im

(57) ABSTRACT

In various embodiments, a process for trying on glasses includes determining an event associated with updating a current model of a user's face. In response to the event, using a set of historical recorded frames of the user's face to update the current model of the user's face. The process includes obtaining a newly recorded frame of the user's face, using the current model of the user's face to generate a corresponding image of a glasses frame, and presenting the image of the glasses frame over the newly recorded frame of the user's face.

22 Claims, 15 Drawing Sheets

(51) Int. Cl.
*G06T 11/60* (2006.01)
*G06T 19/20* (2011.01)
*G06V 10/75* (2022.01)
*G06V 40/16* (2022.01)

(56) References Cited

U.S. PATENT DOCUMENTS

| | | | |
|---|---|---|---|
| 6,142,628 | A | 11/2000 | Saigo |
| 6,329,989 | B1 | 12/2001 | Qi |
| 6,583,792 | B1 | 6/2003 | Agnew |
| 6,847,383 | B2 | 1/2005 | Agnew |
| 7,016,824 | B2 | 3/2006 | Waupotitsch |
| 8,439,500 | B2 | 5/2013 | Dubois |
| 8,675,045 | B2 | 3/2014 | Marin |
| 8,762,174 | B2 | 6/2014 | Suy |
| 9,208,608 | B2 | 12/2015 | Turetzky |
| 9,235,929 | B2 | 1/2016 | Turetzkey |
| 9,236,024 | B2 | 1/2016 | Coon |
| 9,262,695 | B2 | 2/2016 | Choukroun |
| 9,286,715 | B2 | 3/2016 | Coon |
| 9,311,746 | B2 | 4/2016 | Gravois |
| 9,342,877 | B2 | 5/2016 | Coon |
| 9,364,142 | B2 | 6/2016 | Hatanaka |
| 9,482,884 | B2 | 11/2016 | Chauveau |
| 9,549,669 | B2 | 1/2017 | Limon |
| 9,569,890 | B2 | 2/2017 | Choukroun |
| 9,628,697 | B2 | 4/2017 | Choukroun |
| 9,629,539 | B2 | 4/2017 | Qi |
| 9,671,617 | B2 | 6/2017 | Haddadi |
| 9,747,719 | B2 | 8/2017 | Dehais |
| 9,772,513 | B2 | 9/2017 | Qi |
| 9,774,839 | B2 | 9/2017 | Coon |
| 9,804,421 | B2 | 10/2017 | Petignaud |
| 9,841,615 | B2 | 12/2017 | Baranton |
| 9,892,561 | B2 | 2/2018 | Choukroun |
| 9,967,555 | B2 | 5/2018 | Qi |
| 9,996,899 | B2 | 6/2018 | Coon |
| 9,996,959 | B2 | 6/2018 | Coon |
| 10,001,663 | B2 | 6/2018 | Bonnin |
| 10,032,297 | B2 | 7/2018 | Qi |
| 10,042,188 | B2 | 8/2018 | Choukroun |
| 10,055,817 | B2 | 8/2018 | Coon |
| 10,108,028 | B2 | 10/2018 | Rego |
| 10,120,207 | B2 | 11/2018 | Le Gallou |
| 10,147,233 | B2 | 12/2018 | Engle |
| 10,201,273 | B2 | 2/2019 | Choukroun |
| 10,380,411 | B2 | 8/2019 | Escalier |
| 10,488,679 | B2 | 11/2019 | Haddadi |
| 10,670,494 | B2 | 6/2020 | Limon |
| 10,702,143 | B2 | 7/2020 | Limon |
| 10,702,149 | B2 | 7/2020 | Limon |
| 10,712,233 | B2 | 7/2020 | Limon |
| 10,876,921 | B2 | 12/2020 | Limon |
| 10,876,923 | B2 | 12/2020 | Limon |
| 10,898,071 | B2 | 1/2021 | Limon |
| 2006/0078172 | A1* | 4/2006 | Zhang .................. G06V 40/168 382/118 |
| 2010/0086175 | A1 | 4/2010 | Yokono |
| 2014/0043329 | A1* | 2/2014 | Wang ..................... G06V 40/16 345/420 |
| 2015/0055086 | A1* | 2/2015 | Fonte ..................... G06F 16/22 700/98 |
| 2015/0235416 | A1 | 8/2015 | Coon |
| 2015/0235428 | A1 | 8/2015 | Engle |
| 2016/0035133 | A1* | 2/2016 | Ye ........................... G06T 15/60 345/419 |
| 2016/0217609 | A1* | 7/2016 | Kornilov ................. G06T 15/60 |
| 2019/0026956 | A1 | 1/2019 | Gausebeck |
| 2019/0146246 | A1 | 5/2019 | Fonte |
| 2020/0225508 | A1 | 7/2020 | Kittenplon |
| 2020/0237210 | A1 | 7/2020 | Limon |
| 2020/0256760 | A1 | 8/2020 | Limon |
| 2020/0285834 | A1* | 9/2020 | Ishii ..................... G06V 40/164 |
| 2020/0397284 | A1 | 12/2020 | Limon |

OTHER PUBLICATIONS

Opengl-Tutorial, Tutorial 3: Matrices, downloaded Feb. 21, 2020.
U.S. Appl. No. 61/650,983, filed May 23, 2012.
U.S. Appl. No. 61/735,951, filed Dec. 11, 2012.

* cited by examiner

FITTING OF GLASSES FRAMES INCLUDING LIVE FITTING

CROSS REFERENCE TO OTHER APPLICATIONS

This application claims priority to U.S. Provisional Patent Application No. 62/979,968 entitled LIVE FITTING OF GLASSES FRAMES filed Feb. 21, 2020, which is incorporated herein by reference for all purposes.

BACKGROUND OF THE INVENTION

When making a decision about an item such as a personal accessory, a consumer typically likes to visualize how the item looks on the consumer's person. In the real world, consumers would try on the item. For example, a person buying glasses may need to make multiple trips to an optician to see how the glasses frames and lens fit. It would be more convenient to be able to try on the item virtually. However, conventional techniques do not provide a comparable experience to real-world try-ons due to processing delays and other technical challenges. It would be desirable to allow people to virtually try on items in a way that is accurate to a real experience.

BRIEF DESCRIPTION OF THE DRAWINGS

Various embodiments of the invention are disclosed in the following detailed description and the accompanying drawings.

DETAILED DESCRIPTION

Figure 1:
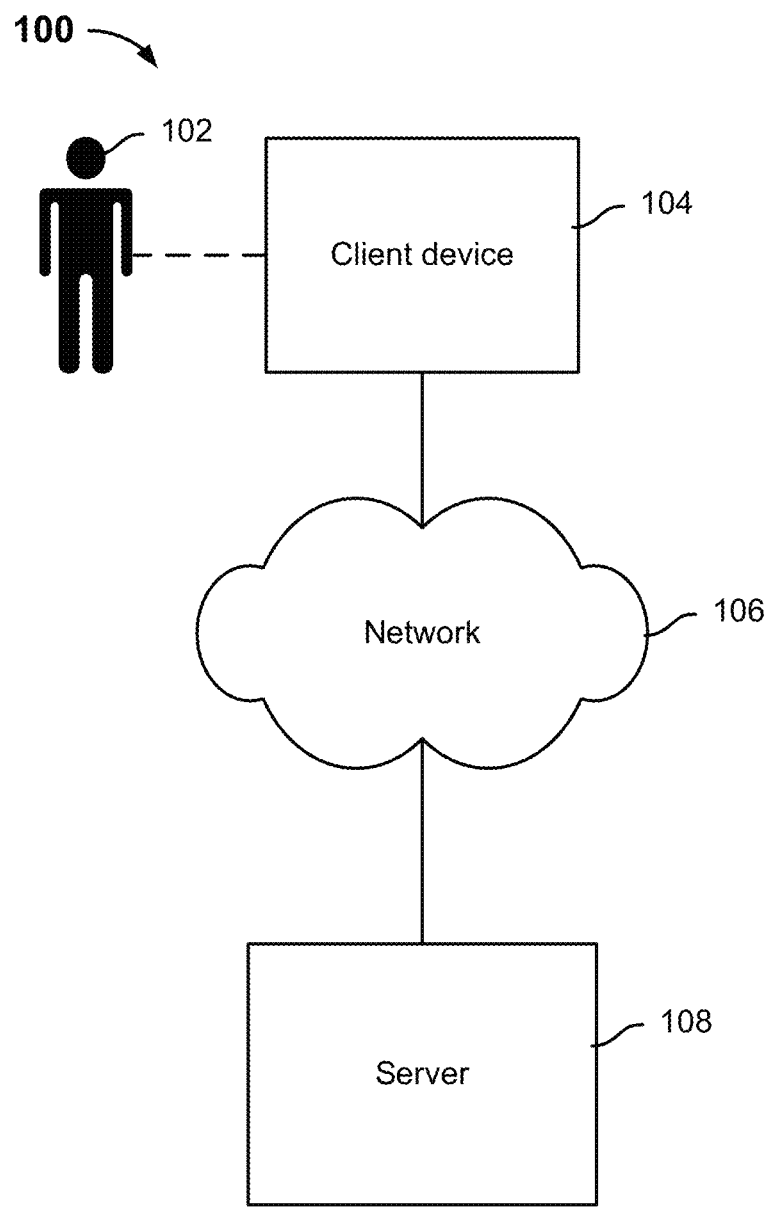
FIG. 1 is a block diagram illustrating an embodiment of a system for live fitting of glasses frames.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "live fitting" or "live try-on" refers to simulating placement of objects on a person's body by displaying the simulation substantially instantaneously. The term "video fitting" or "video try-on" refers to simulating placement of objects on a person's body by displaying the simulation after some delay. One example of live fitting is displaying the placement of glasses frames on a person's face at substantially the same time the person is looking at a camera, providing an experience akin to looking in a mirror with the glasses on. One example of video fitting is uploading one or more images of a person's face, determining glasses placement on the person's face, and displaying a resultant image or series of images (video) of the glasses placed on the person's face.

Techniques for live fitting of glasses frames disclosed provide the following experiences for a user. A virtual "mirror" is displayed on an electronic device screen of a user so the user can see themselves in the mirror augmented with a selected pair of frames. The user can then try various different frames on in sequence.

Compared with the video try-on techniques, the "live try-on" or "virtual mirror" style of glasses try-on offers a more immediate view of the user's face with a selected pair or frames rendered onto the images of the face in real time. In various embodiments, a user immediately sees a selected pair of glasses on their face. They can engage with the live experience to see how they look from different angles by turning their head as they wish. As the user moves their head, the glasses move in the same way to simulate how the user would appear if actually wearing the glasses. At will, the user may select a different pair of frames, and the live rendered image of the user's face would appear wearing the newly selected glasses.

While the user moves their head, the technology is gathering information about the size and shape of the user's face and head. Various visual cues are provided as part of the interface to prompt the user to move in various ways in order for the system to gather the required amount of information to arrive at an accurate representation of the user's head and face along including proper scale/sizing of that representation. An example of how to determine an accurate scale/size is further described herein. Visual cues can be provided to indicate how much information has been collected and how much is still needed. For example, the visual cues show when enough information has been acquired to render high quality and accurate virtual try-on views.

FIG. 1 is a block diagram illustrating an embodiment of a system for live fitting of glasses frames. For simplicity, the system is referred to as being for live fitting of glasses frames. The data generated by the system can be used in a variety of other applications including using the live fitting data for video fitting of glasses frames.

In this example, system 100 includes client device 104, network 106, and server 108. The client device 104 is coupled to the server 108 via network 106. Network 106 may include high speed data networks and/or telecommunications networks. A user 102 may interact with the client device to "try on" a product, e.g., providing user images of the user's body via the device and viewing a virtual fitting of the product to the user's body according to the techniques further described herein.

Client device 104 is configured to provide a user interface for user 102. For example, client device 104 may receive input such as images of the user captured by a camera of the device or observe user interaction by user 102 with the client device. Based on at least some of the information collected by the client device, a simulation of placing the product on the user's body is output to the user.

In various embodiments, the client device includes an input component such as a camera, depth sensor, lidar sensor, other sensor, or a combination of multiple sensors. A camera may be configured to observe and/or capture images of the user from which physical characteristics may be determined. The user may be instructed to operate the camera or pose for the camera as further described herein. The information collected by the input components may be used and/or stored for making a recommendation.

Server 108 is configured to determine physical characteristics from input images, determine a correlation between the physical characteristics and a product, and output one or more images of the product integrated with the input images such as fitting glasses frames to the user's face. The server 108 can be remote from client device 104 and accessible via network 106 such as the Internet. As further described with respect to FIGS. 2 and 3, various functionalities may be embodied in either the client or the server. For example, functionalities traditionally associated with the server may be performed not only by the server but also/alternatively by the client and vice versa. The output can be provided to the user with very little (if any) delay after the user provides input images so that the user experience is a live-fitting of a product. Virtual fitting of a product to a user's face has many applications. Example applications of virtually trying-on facial accessories such as eyewear, makeup, jewelry, etc. For simplicity, the examples herein chiefly describe live fitting of glasses frames to a user's face/head but this is not intended to be limiting and the techniques may be applied to trying on other types of accessories and may be applied to video fittings (e.g., may have some delay).

Figure 2:
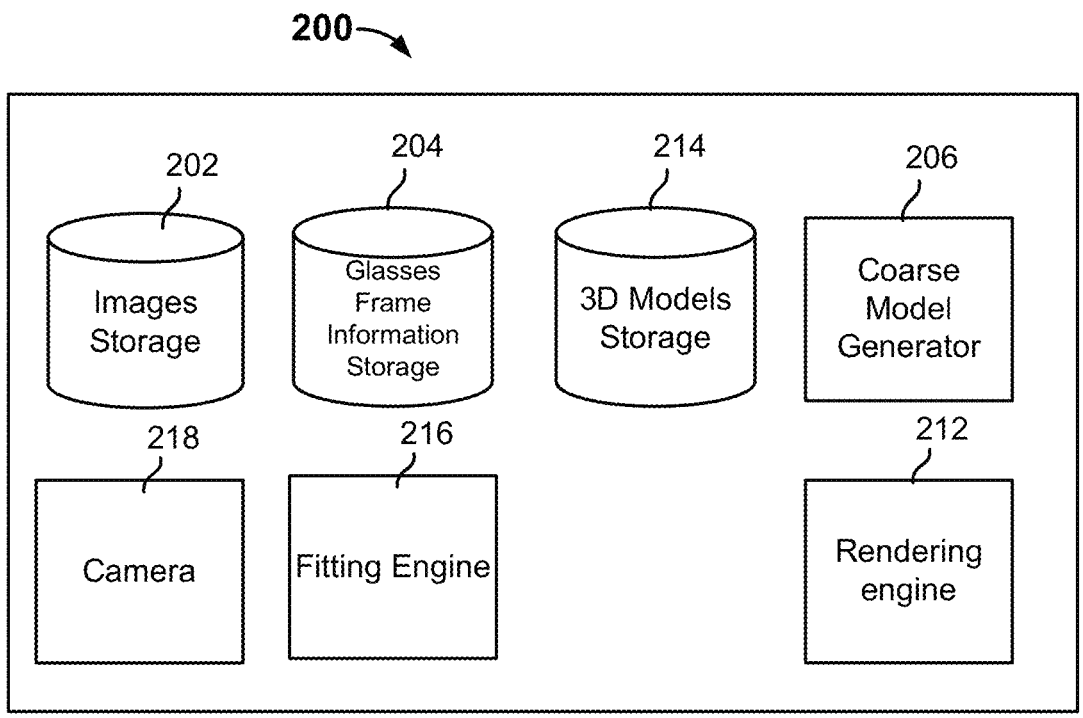
FIG. 2 is a block diagram illustrating an embodiment of a client device for virtual fitting of glasses frames.

FIG. 2 is a block diagram illustrating an embodiment of a client device for virtual fitting of glasses frames. In some embodiments, client device 104 of FIG. 1 is implemented using the example of FIG. 2.

In the example, the client device includes images storage 202, glasses frame information storage 204, 3D models storage 214, coarse model generator 206, fitting engine 216, and rendering engine 212. The client device may be implemented with additional, different, and/or fewer components than those shown in the example. Each of images storage 202, glasses frame information storage 204, and 3D models storage 214 may be implemented using one or more types of storage media. Each of model generator 206, fitting engine 216, and rendering engine 212 may be implemented using hardware and/or software.

Images storage 202 is configured to store sets of images. The images can be in various formats or different types including by not limited to RGB images and depth images. In some embodiments, each set of images is associated with a recorded video or a series of snapshots of various orientations of a user's face as further described with respect to FIG. 4. In some embodiments, each set of images is stored with data associated with the whole set or individual images of the set. In various embodiments, at least a subset of the user images may be stored locally and/or remotely, e.g., sent to server 108 for storage.

Camera 218 is configured to capture images of the user. The captured images may be stored at 202 and used to determine physical characteristics. As described with respect to FIG. 1, the camera may have various sensors such as depth sensors helpful for generating a model of the user's head. An example of a camera with depth sensors is the TrueDepth® camera available in some iPhones. Depending on camera hardware, images and data of various formats and types may be captured including but not limited to RGB images and depth images.

The images may have associated intrinsic and/or extrinsic information. The intrinsic and extrinsic information can be generated by a third party (e.g., client device application) or generated as further described with respect to FIG. 3. In various embodiments, intrinsic and extrinsic information provided by a third party can be further processed using the techniques described with respect to 308 and 310 of FIG. 3. The information can be generated locally at the device or remotely by a server.

Coarse model generator 206 is configured to determine a mathematical 3D model for a user's face associated with each set of images. The coarse model generator may be implemented using a third party mesh model such as those native to mobile devices. The Model I/O framework available in iOS® is one such example. In various embodiments, a model can be obtained from a remote server 108 instead of locally generating a model or to supplement local model information. Although the model generator is referred to as a "coarse" model generator here to distinguish it from the one shown in FIG. 3, model generator 206 may be configured to generate a model with at least the same granularity as one generated by model generator 306 depending on techniques used and available processing resources.

Fitting engine 216 (sometimes also called a comparison engine) is configured to determine a fit between a 3D model of a user's face (e.g., that is stored at 3D models storage) and a 3D model of a glasses frame. In some embodiments, the fitting engine processes a coarse model of the user's face. For example, the coarse 3D model provides indications (e.g., suggestions or clues) for automatically placing objects or features such as hats, glasses, facial hair, etc. on the coarse model. Placement can be improved by determining additional landmarks. For example, where the coarse model is missing ear juncture points, the fitting engine can determine those points as further described with respect to 306 of FIG. 3.

Glasses frame information storage 204 is configured to store information associated with various glasses frames. For example, information associated with a glasses frame may include measurements of various areas of the frame (e.g., bridge length, lens diameter, temple distance), renderings of the glasses frame corresponding to various (R, t) pairs, a mathematical representation of a 3D model of the glasses frame that can be used to render a glasses image for various (R, t) parameters, a price, an identifier, a model number, a description, a category, a type, a glasses frame material, a brand, and a part number. In some embodiments, the 3D model of each glasses frame includes a set of 3D points that define various locations/portions of the glasses frame, including, for example, one or more of the following: a pair of bridge points and a pair of temple bend points. In various embodiments, a 2D image of the glasses is generated at the client device. In other embodiments, a 2D image of the glasses is generated by a server such as 108 of FIG. 1 and sent to the client device.

Rendering engine 212 is configured to render a 2D image of a glasses frame to be overlaid on an image. For example, the selected glasses frame may be a glasses frame for which information is stored at glasses frame information storage 204. For example, the image over which the glasses frame is to be overlaid may be stored as part of a set of images stored at images storage 202. In some embodiments, rendering engine 212 is configured to render a glasses frame (e.g., selected by a user) for each of at least a subset of a set of images. In various embodiments, the image over which the glasses frame is to be overlaid is fed from the camera. In some embodiments, rendering engine 212 is configured to transform the 3D model of the glasses frame after it has been placed onto a 3D face (e.g., the 3D model of a user's face or another 3D face), by extrinsic information such as an (R, t) pair corresponding to an image. An (R, t) pair is an example of extrinsic information determined for an image of a set of images associated with a user's face, where R is a rotation matrix and t is a translation vector corresponding to that image as further described with respect to 308. In some embodiments, rendering engine 212 is also configured to perform occlusion culling on the transformed glasses frame using an occlusion body. The occluded glasses frame at the orientation and translation associated with the (R, t) pair excludes certain portions hidden from view by the occlusion body at that orientation/translation. The rendered glasses frame for an image should show the glasses frame at the orientation and translation corresponding to the image and can be overlaid on that image in a playback of the set of images to the user at a client device.

Figure 3:
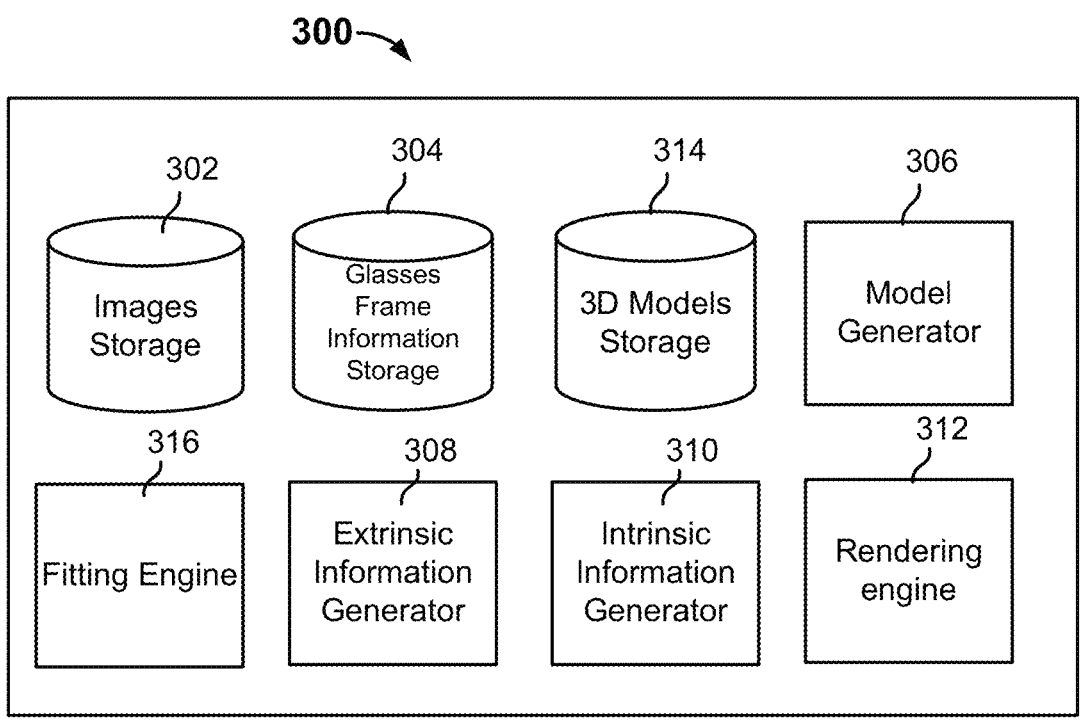
FIG. 3 is a block diagram illustrating an embodiment of a server for virtual fitting of glasses frames.

FIG. 3 is a block diagram illustrating an embodiment of a server for virtual fitting of glasses frames. In some embodiments, server 108 of FIG. 1 is implemented using the example of FIG. 3. In the example, the server includes images storage 302, glasses frame information storage 304, 3D models storage 314, model generator 306, fitting engine 316, extrinsic information generator 308, intrinsic information generator 310, and rendering engine 312. The server may be implemented with additional, different, and/or fewer components than those shown in the example. The functionalities described with respect to client 200 and server 300 may be embodied in either device. For example, a coarse model generated by 206 may be processed (e.g., improved) locally on the client or may be sent to server 300 for further processing. Each of images storage 302, glasses frame information storage 304, and 3D models storage 314 may be implemented using one or more types of storage media. Each of model generator 306, fitting engine 316, extrinsic information generator 308, intrinsic information generator 310, and rendering engine 312 may be implemented using hardware and/or software. Each of the components are like their counterparts in FIG. 2 unless otherwise described.

Model generator 306 is configured to determine a mathematical 3D model for a user's face associated with each set of images. The model generator 306 may be configured to generate a 3D model from scratch or based on the coarse model generated by model generator 206. in various embodiments, the model generator is configured to perform the process of FIG. 9 to generate a 3D model. For example, the mathematical 3D model of the user's face (i.e., the mathematical model of the user's face in 3D space) may be set at the origin. In some embodiments, the 3D model of the user's face comprises a set of points in 3D space that define a set of reference points associated with (e.g., the locations of) features on the user's face from the associated set of images. Examples of reference points include endpoints of the user's eye, the endpoints of the user's eyebrows, the bridge of the user's nose, the user's ear juncture points, and the tip of the user's nose. In some embodiments, the mathematical 3D model determined for a user's face is referred to as an M matrix that is determined based on the set of reference points associated with features on the user's face from the associated set of images. In some embodiments, model generator 306 is configured to store the M matrix determined for a set of images with the set at images storage 302. In some embodiments, model generator 306 is configured to store the 3D model of a user's face at 3D models storage 314. The model generator 306 may be configured to perform the process of FIG. 9.

Extrinsic information generator 308 and intrinsic information generator 310 are configured to generate information that can be used for live try-on or video try-on. As described with respect to FIG. 2, the information may be obtained from a third party, the information can be generated by building upon the third party information, or can be generated as follows.

Extrinsic information generator 308 is configured to determine a set of extrinsic information for each of at least a subset of a set of images. For example, the set of images may be stored at images storage 302. In various embodiments, a set of extrinsic information corresponding to an image of a set of images describes one or more of the orientation and translation of the 3D model of the user's face determined for the set of images needed to result in the correct appearance of the user's face in that particular image. In some embodiments, the set of extrinsic information determined for an image of a set of images associated with a user's face is referred to as an (R, t) pair where R is a rotation matrix and t is a translation vector corresponding to that image. As such, the (R, t) pair corresponding to an image of a set of images can transform the M matrix (that represents the 3D of the user's face) corresponding to that set of images (R×M+t) into the appropriate orientation and translation of the user's face that is shown in the image associated with that (R, t) pair. In some embodiments, extrinsic information generator 208 is configured to store the (R, t) pair determined for each of at least a subset of a set of images with the set at images storage 302.

Intrinsic information generator 310 is configured to generate a set of intrinsic information for a camera associated with recording a set of images. For example, the camera was used to record a set of images stored at images storage 302. In various embodiments, a set of intrinsic information corresponding to a camera describes a set of parameters associated with the camera. For example, the brand or type of camera can be sent by the device 200. As another example, a parameter associated with a camera comprises a focal length. In some embodiments, the set of intrinsic information associated with a camera is found by correlating points on a scaling reference object between different images of the user with the scaling reference object in the images, and calculating the set of intrinsic information that represents the camera's intrinsic parameters using a camera calibration technique. In some embodiments, the set of intrinsic information associated with a camera is found by using a technique of auto-calibration which does not require a scaling reference. In some embodiments, the set of intrinsic information associated with a camera is referred to as an I matrix. In some embodiments, the I matrix projects a version of a 3D model of a user's face transformed by an (R, t) pair corresponding to a particular image onto the 2D surface of the focal plane of the camera. In other words, I×(R×M+t) results in the projection of the 3D model in the orientation and translation determined by the M matrix and the (R, t) pair corresponding to an image, onto a 2D surface. The projection onto the 2D surface is the view of the user's face as seen from the camera. In some embodiments, intrinsic information generator 210 is configured to store an I matrix determined for the camera associated with a set of images with the set at images storage 302.

In some embodiments, fitting engine 316 is configured to determine a set of computed bridge points that would be included in a set of "ideal glasses" 3D points associated with a particular user. In various embodiments, the set of "ideal glasses" 3D points associated with a particular user comprises markers that can be used to determine the desired alignment or fit between the 3D model of the glasses frame and the 3D model of the user's face. In some embodiments, in determining the set of computed bridge points, fitting engine 316 is configured to determine a plane in 3D space using at least three points from the set of 3D points that are included in the 3D model of the user's face. For example, the plane is determined using the two internal eye corners and the two ear juncture points from the 3D model of the user's face. Fitting engine 316 is configured to determine a vector that is parallel to the plane and this vector is sometimes referred to as the "face normal." The distance between the midpoint of the two internal eyebrow points and the midpoint of the two internal eye corners along the face normal is computed and is sometimes referred as the "eyebrow z-delta." Fitting engine 316 is configured to determine a "bridge shift" value by multiplying the eyebrow z-delta by a predetermined coefficient. For example, the coefficient is close to 1.0 and was computed heuristically. Fitting engine 316 is configured to determine the set of computed bridge points by moving each of the two internal eye corners of the 3D model of the user's face towards the camera in the direction of the face normal by the bridge shift value. In some embodiments, fitting engine 316 is also configured to determine a vertical shift, which is determined as a function of the distance between the midpoint of the two internal eyebrow points and the midpoint of the two internal eye corners and a predetermined coefficient. In some embodiments, the set of computed bridge points is further moved along the distance between the midpoint of the two internal eyebrow points and the midpoint of the two internal eye corners based on the vertical shift. In some embodiments, other 3D points that are included in the set of ideal glasses 3D points are two temple bend points, which fitting engine 316 is configured to set to equal the two ear juncture points of the 3D model of the user's face. In some embodiments, the initial placement of the 3D model of the glasses frame relative to the 3D model of the user's face can be determined using the two bridge points and/or the two temple bend points of the set of ideal glasses 3D points. In some embodiments, fitting engine 316 is configured to determine the initial placement by aligning a line between the bridge points of the 3D model of the glasses frame with the line between the computed bridge points of the set of ideal glasses 3D points associated with the user. Then, the bridge points of the 3D model of the glasses frame are positioned by fitting engine 316 such that the midpoints of both the bridge points of the 3D model of the glasses frame and the computed bridge points of the set of ideal glasses 3D points associated with the user are in the same position or within a predetermined distance of each other. The bridge points of the 3D model of the glasses frame are then fixed and the temple bend points of the 3D model of the glasses frame are rotated about the overlapping bridge lines, which serve as an axis, such that the temple bend points of the 3D model of the glasses frame are aligned or within a predetermined distance of the ear juncture points of the 3D model of the user's face. As described above, in some embodiments, the ear juncture points of the 3D model of the user's face are sometimes referred to as the temple bend points of the set of ideal glasses 3D points associated with the user.

In some embodiments, after or alternative to determining an initial placement of the 3D model of the glasses frame relative to the 3D model of the user's face, fitting engine 316 is configured to determine a set of nose curve points in 3D space that is associated with a user. The set of nose curve points associated with the user can be used to determine a placement of the 3D model of the glasses frame relative to the 3D model of the user's face or modify an initial placement of the 3D model of the glasses frame relative to the 3D model of the user's face that was determined using the set of ideal glasses 3D points. In some embodiments, fitting engine 316 is configured to determine the set of nose curve points in 3D space by morphing a predetermined 3D face to correspond to the 3D model of the user's face. In some embodiments, the predetermined 3D face comprises a 3D model of a generic face. In some embodiments, the predetermined 3D face includes a predetermined set of points along the nose curve. In some embodiments, morphing the predetermined 3D face to correspond to the 3D model of the user's face comprises moving the corresponding locations/vertices (and their respective neighborhood vertices) of the predetermined 3D face to match or to be closer to corresponding locations on the 3D model of the user's face. After the predetermined 3D face has been morphed, the predetermined set of points along the nose curvature has also been moved as a result of the morphing. As such, after the predetermined 3D face has been morphed, the updated locations in 3D space of the predetermined set of points along the nose curve of the predetermined 3D face are referred to as a morphed set of 3D points of the morphed nose curvature associated with the user.

In some embodiments, a region/feature such as a nose curve can be determined from a 3D face model or a coarse model by using 3D points (also called markers or vertices) and fitting the region to the set of vertices as follows. Typically, the ordering of indices of vertices for the coarse head model and 3D head model are fixed. In other words, the fitting engine can pre-record which vertices will approximately correspond to a region, such as a curve on the nose. These vertices can slightly change their locations during model generation and might not be nicely aligned on a curve. One approach to generate a nose curve is to generate a set of points in 3D by selecting pre-recorded vertices on the head mesh. Then, a plane can be fitted to these 3D points. In other words, the fitting engine finds the plane that best approximates the space covered by these 3D points. Then, the fitting engine finds the projection of these points on that plane. This provides a clean and accurate nose curve that can be used during fitting.

In some embodiments, fitting engine 316 is configured to modify the initial placement of the 3D model of the glasses frame relative to the 3D model of the user's face by determining a segment between two adjacent points among the morphed set of nose curvature points associated with the user that is the closest to the bridge points of the 3D model of the glasses frame and compute a normal to this segment, which is sometimes referred to as the "nose curvature normal." Then, fitting engine 316 is configured to then position the 3D model of the glasses frame along the nose curvature normal toward this segment until the bridge points of the 3D model of the glasses frame are within a predetermined distance of the segment. In some embodiments, fitting engine 316 is further configured to bend the temple bend points of the 3D model of the glasses frame to align with the ear juncture points of the 3D model of the user's face.

Figure 4:
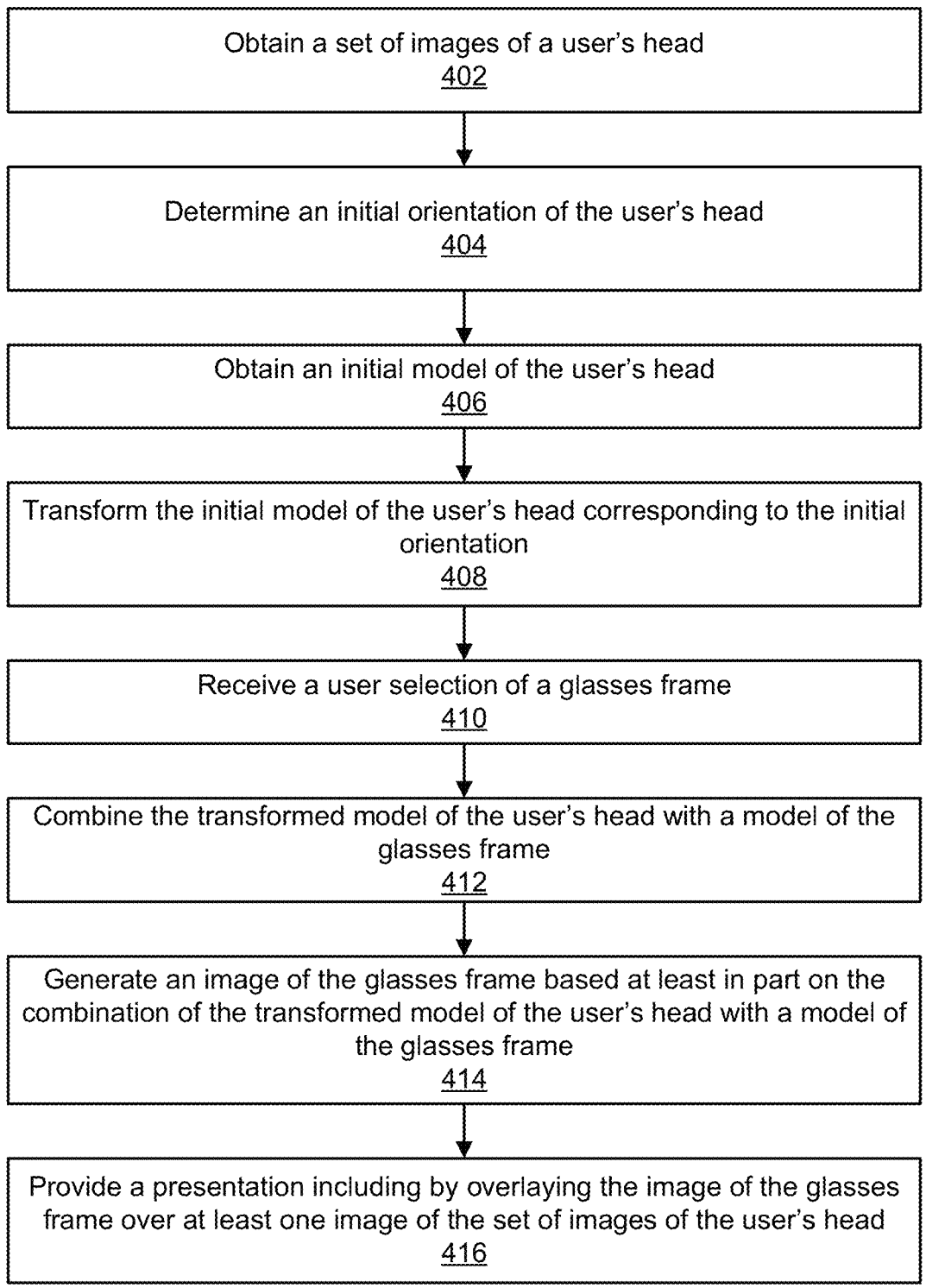
FIG. 4 is a flow chart illustrating an embodiment of a process for trying on glasses.

FIG. 4 is a flow chart illustrating an embodiment of a process for trying on glasses. This process may be implemented by system 100. The process can be performed for live try-on or for video try-on.

In the example shown, the process begins by obtaining a set of images of a user's head (402). For example, when a user turns on the camera of a device, the user's face is displayed on the screen as a virtual mirror. Gathering images of the user's face from a variety of different angles provides inputs to reconstruct a 3D model of the user's head and face.

In some embodiments, the user can select a pair of glasses frames to see on their face live. The user can move their head and face and the glasses position and orientation is updated continually to track the motion of the face and remain in the proper position with respect to the motion of the face.

The process determines an initial orientation of the user's head (404). For example, the process may determine whether the user's head is tilted, facing forward, etc. The orientation of the user's head may be determined in a variety of ways. For example, the process can determine a set of facial landmarks using the set of images of the user's head and use the landmarks to determine orientation. As further described with respect to FIGS. 2 and 3, landmarks may be facial features such as bridge points, eye corners, ear junctures, and the like. As another example, the orientation can be determined by using depth images and pose information provided by a third party (e.g., ARKit) as described with respect to FIG. 9.

The process obtains an initial model of the user's head (406). The initial/default model of the user's head may be generated in a variety of ways. For example, the model may be obtained from a third party (e.g., coarse model described with respect to FIG. 2). As another example, the model may be obtained from a server (e.g., the 3D model described with respect to FIG. 3). As yet another example, the model may be generated based on historical user's faces. The "historical" user's faces may be a statistical model generated from images stored within a predefined time period (e.g., recent faces in the last couple of hours, days, weeks, etc.).

The accuracy of the 3D model increases with additional information gathered in the form of 2D color images of the face from different angles and corresponding depth sensor information for the face. In various embodiments, the process instructs the user to turn his or her head from left to right as a way to obtain sufficient information to build a satisfactory 3D model. By way of non-limiting example, on the order of 10 frames is sufficient to create a 3D model of the required accuracy. More accuracy in the shape of the 3D model enables better fitting of the glasses on the user's head, including the position and angle of the glasses in 3D space. More accuracy also enables better analysis of what parts of the glasses would be visible when placed on the face/head and what part of the glasses would be occluded by facial features such as the nose or other things like the ear.

Figure 8A:
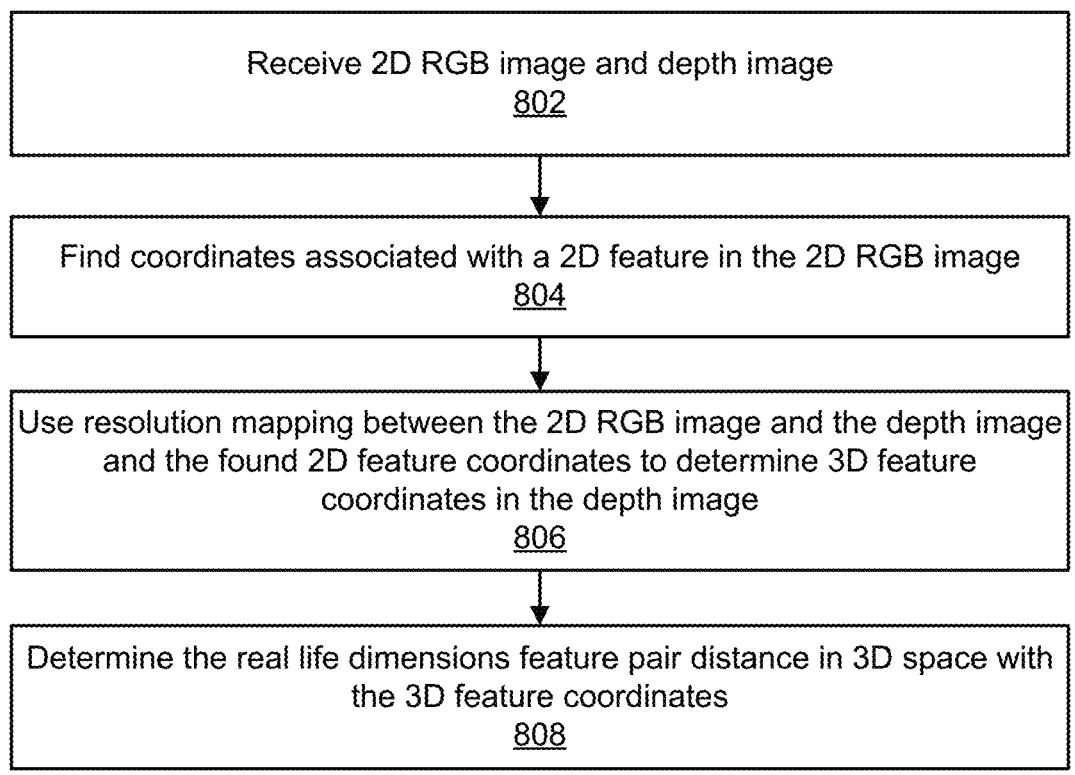
FIG. 8A is a flow chart illustrating an embodiment of a process for scaling a head model using a relatively coarse model.
Figure 8B:
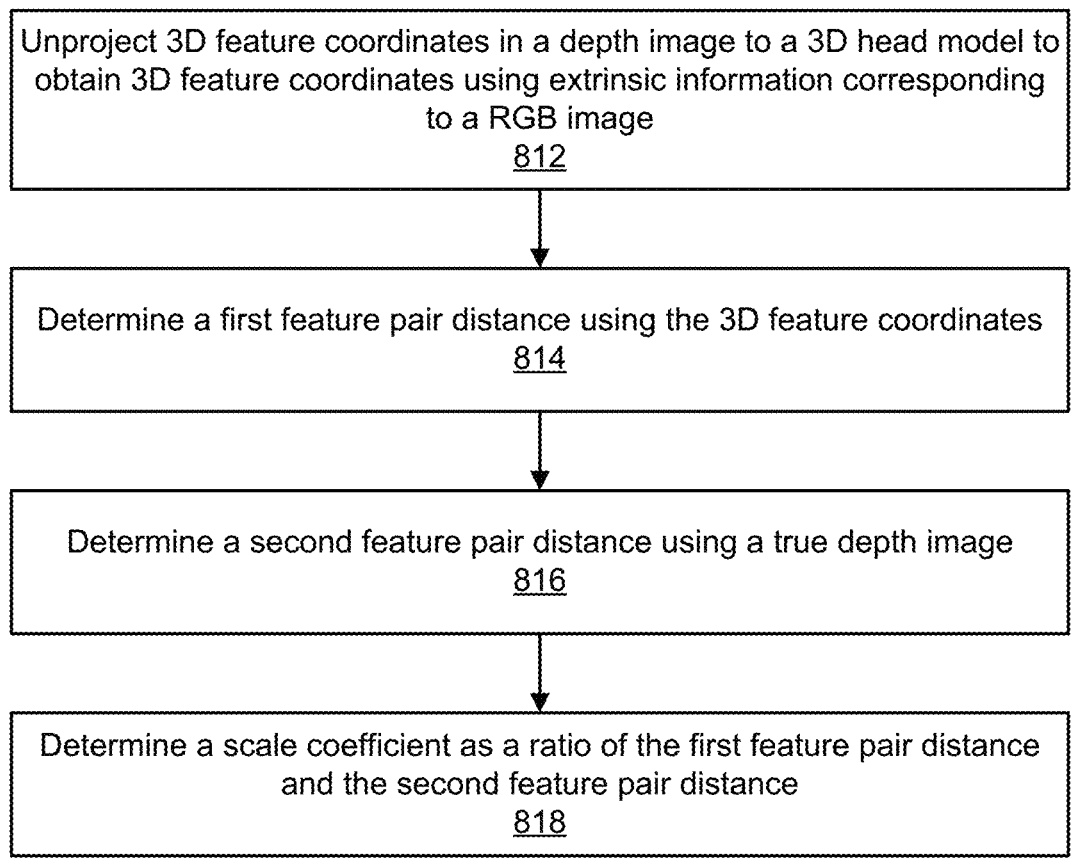
FIG. 8B is a flow chart illustrating an embodiment of a process for scaling a head model using a relatively finer model.
Figure 9:
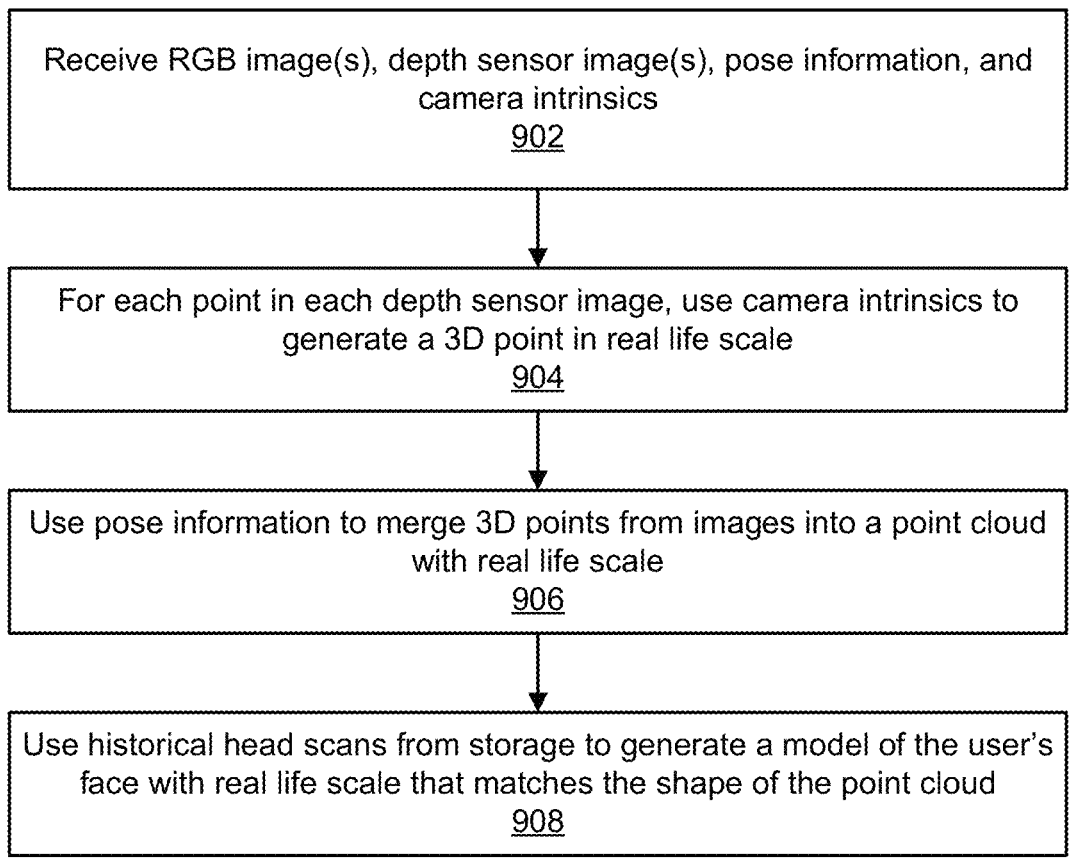
FIG. 9 is a flow chart illustrating an embodiment of a process for scaling and generating a head model.

More accuracy in the 3D model also contributes to more accurate measurements of the user's face and head once "scale" is established in the 3D model by determining scale using the process of FIG. 8B or FIG. 9. As further described herein, the process of FIG. 8B determines the measure of the distance between some two points on the face/head. This first distance that is measured is typically the distance between the pupils in a frontal view of the face; this is known as the pupillary distance or PD. With knowledge of the distance between those two points in the virtual 3D space, we can compute the distance between any other two points in that space. Other measures of interest that can be computed are things like face width, nose bridge width, distance between the center of the nose and each pupil separately (dual PD).

Additional measurements that include the scaled 3D head and the 3D model of a pair of glasses (with known scale) fitted onto the head can be computed as well. Temple length is one example (the distance from the hinge of a temple arm of a pair of glasses to the ear juncture where the temple rests).

The process transforms the initial model of the user's head corresponding to the initial orientation (408). For example, the model of the head can be rotated in 3D space to correspond to the initial orientation.

The process receives a user selection of a glasses frame (410). The user may provide a selection via a user interface by selecting a specific glasses frame from several selections as further described with respect to FIG. 14.

The process combines the transformed model of the user's head with a model of the glasses frame (412). The combination of the user's head with the glasses frames provides an accurate representation of how the glasses will look on the user's head including a realistic visualization of the scale and placement of the glasses on facial landmarks such as nose bridge, temples, etc. Compared with conventional techniques, the combination is more realistic because it reduces/eliminates incorrect occlusions. An occlusion is a foreground object hiding any background object in an image because the foreground object is in front of the background object in 3D space. Correct occlusions more realistically represent glasses fitted to a head because it properly hides parts of the glasses behind parts of the face. Incorrect occlusions are due to having an inaccurate head model especially where glasses intersect or touch the head, when the user's head model or glasses frame model are not combined accurately, when the head pose is not accurately determined for a specific image (when extrinsics (R,t) are not accurate), among other things. Fitting of glasses to head depends on the accuracy of the 3D head model, so an inaccurate head model will lead to an inaccurate fitting. Thus, a better head model would result in more accurate occlusions, providing a more life-like try-on experience for the user.

The process generates an image of the glasses frame based at least in part on the combination of the transformed model of the user's head with a model of the glasses frame (414). The image of the glasses frame is 2D so that it can later be presented on a 2D image of the user's head. In various embodiments, the image of the glasses frame can be updated depending on certain conditions being met. For example, if a user's facial features are not covered by an initial 2D image of the glasses frame due to inaccurate scale, the initial 2D image can be altered to enlarge to stretch the frame in one or more dimensions to reflect the more accurate scale as the model(s) get improved.

The process provides a presentation including by overlaying the image of the glasses frame over at least one image of the set of images of the user's head (416). The presentation can be output on a user interface such as the ones shown in FIGS. 10-15.

Figure 5:
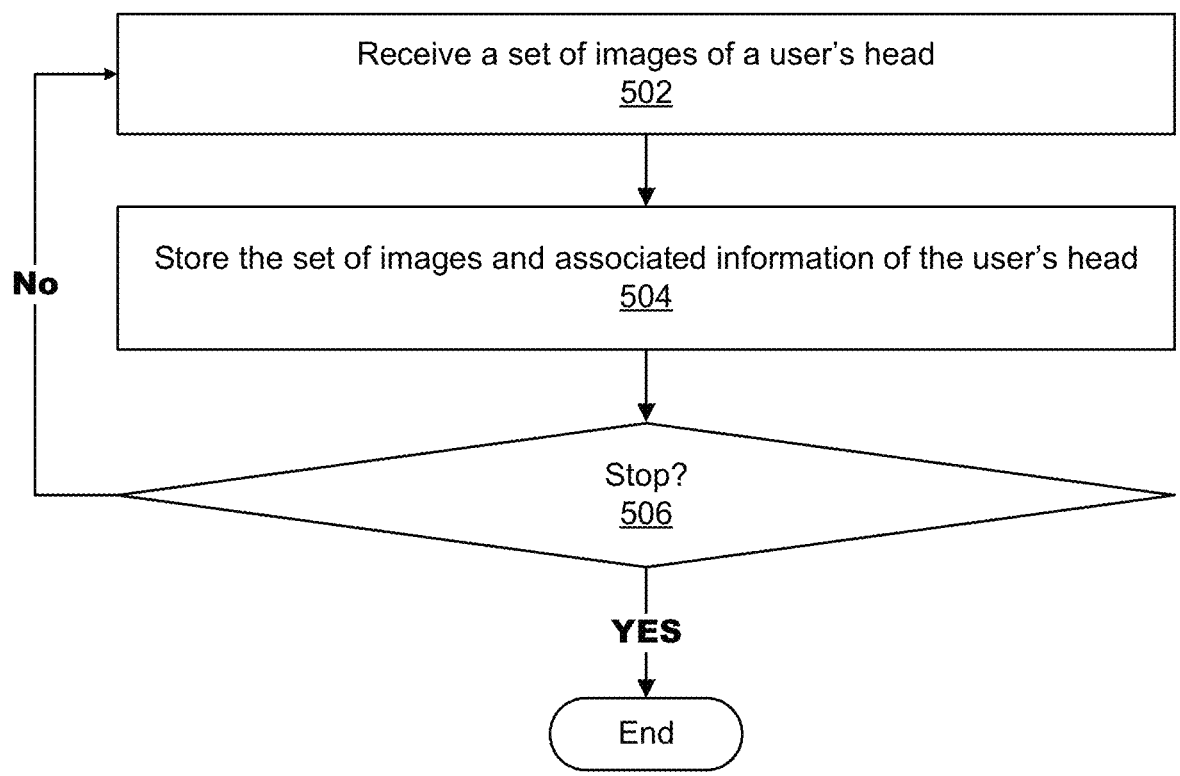
FIG. 5 is a flow chart illustrating an embodiment of a process for obtaining images of a user's head.

FIG. 5 is a flow chart illustrating an embodiment of a process for obtaining images of a user's head. This process may be performed as part of another process such as 402 of FIG. 4. This process may be implemented by system 100.

In the example shown, the process begins by receiving a set of images of a user's head (502). In various embodiments, the user may be instructed to move his or her head to obtain the desired images. For example, a user may be instructed via a user interface to take a forward-facing image, then turn his or her head to the left, then turn his or her head to the right or to slowly turn from one direction to another. If the user is moving too fast or slowly, the user may be prompted to slow down or speed up.

The process stores the set of images and associated information of the user's head (504). Associated information may include sensor data such as depth data. The image and associated information may later be used to construct a model of the user's head or other purposes as further described herein.

The process determines whether to stop (506). For example, when sufficient images (number of images, quality of images, etc.) have been captured, the process determines that the stopping condition is met. If the stopping condition is not met, the process returns to 502 to receive further images. Otherwise, if the stopping condition is met, the process terminates.

Figure 10:
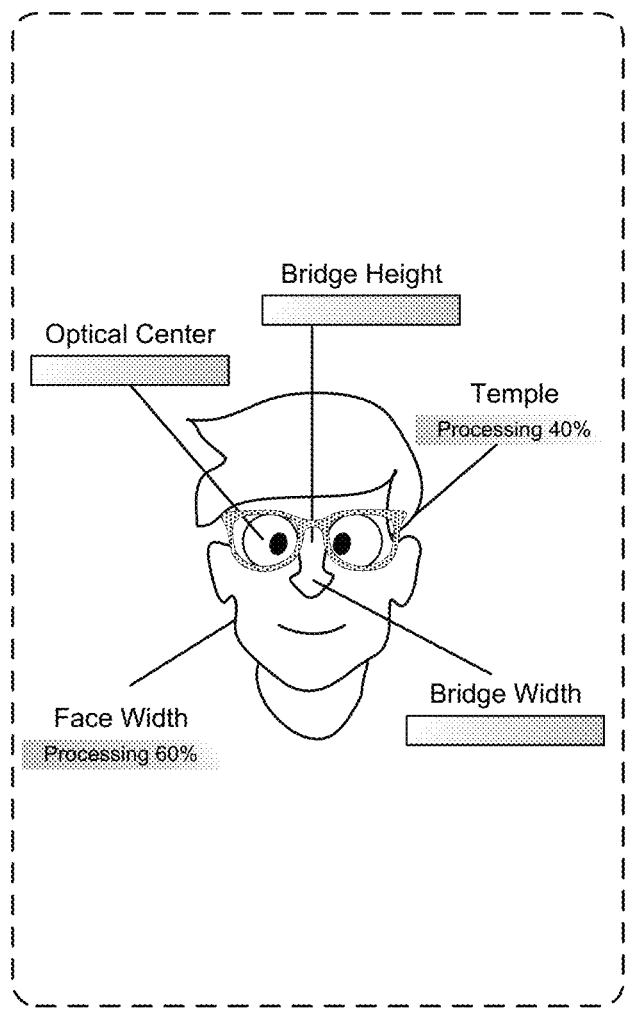
FIG. 10 illustrates an example of a frame fit graphical user interface obtained in some embodiments.
Figure 11:
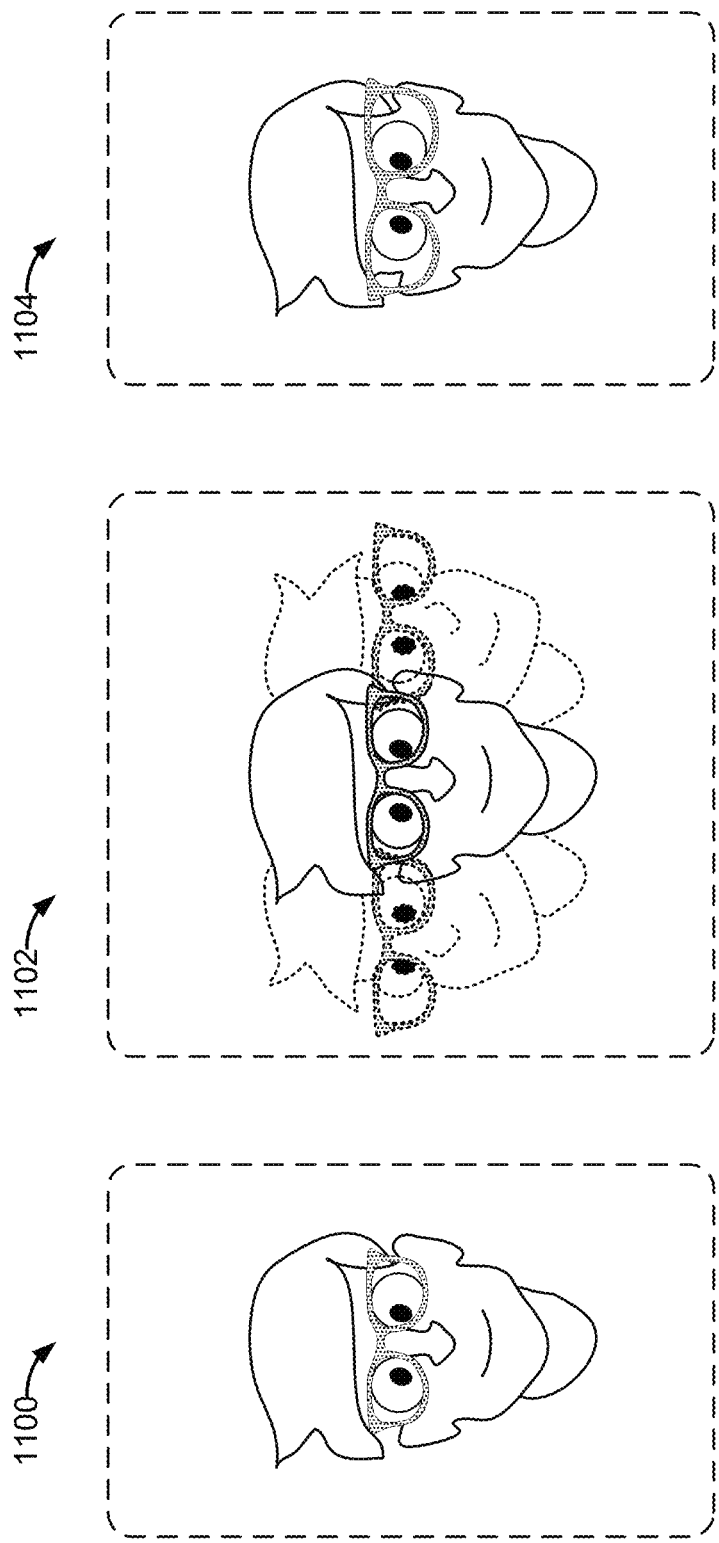
FIG. 11 illustrates an example of a frame scale graphical user interface obtained in some embodiments.
Figure 12:
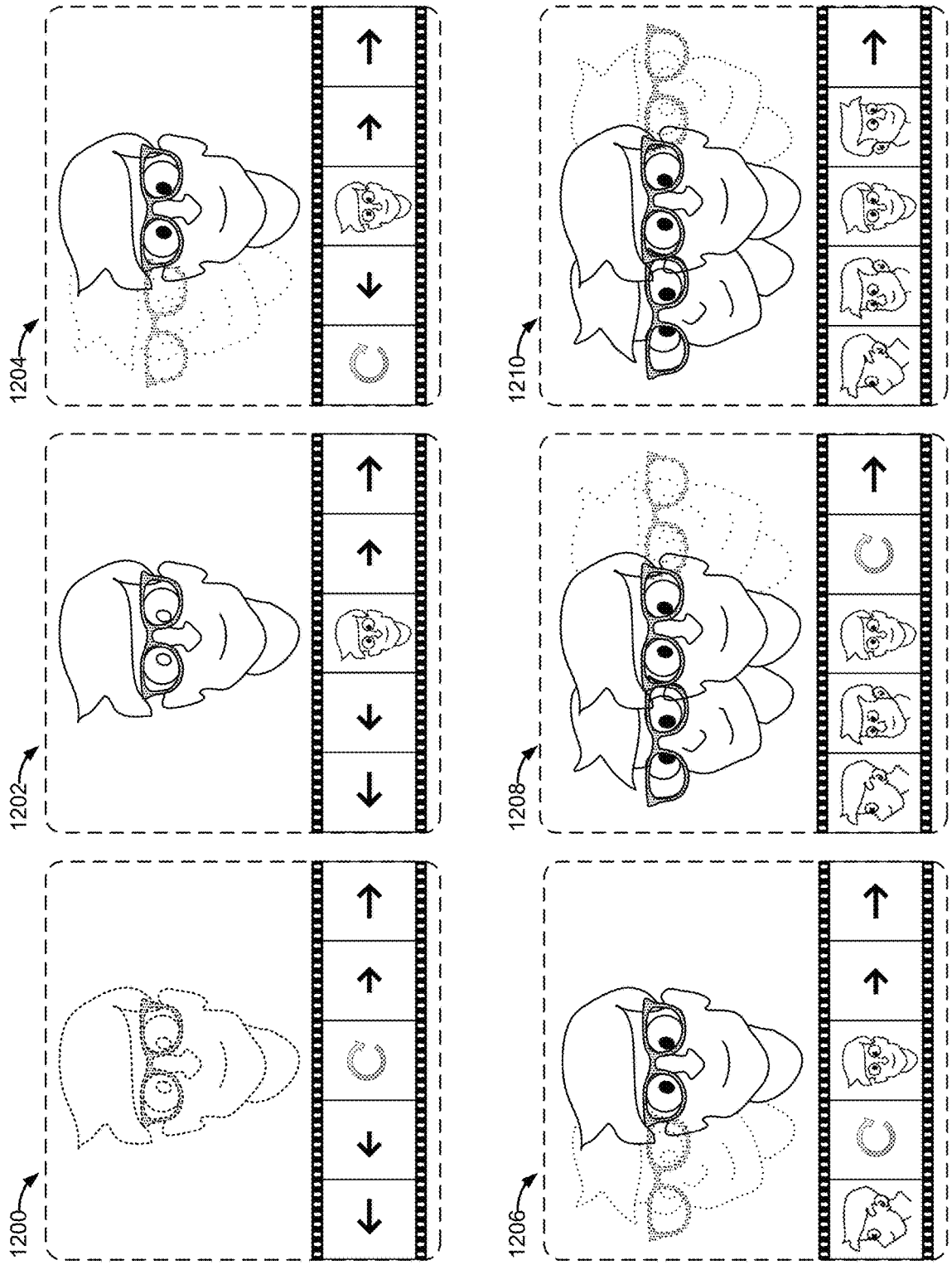
FIG. 12 illustrates an example of a desired and captured facial angles graphical user interface obtained in some embodiments.

Some examples of a user interface for obtaining images of a user's head are shown in FIGS. 10-12.

Figure 6:
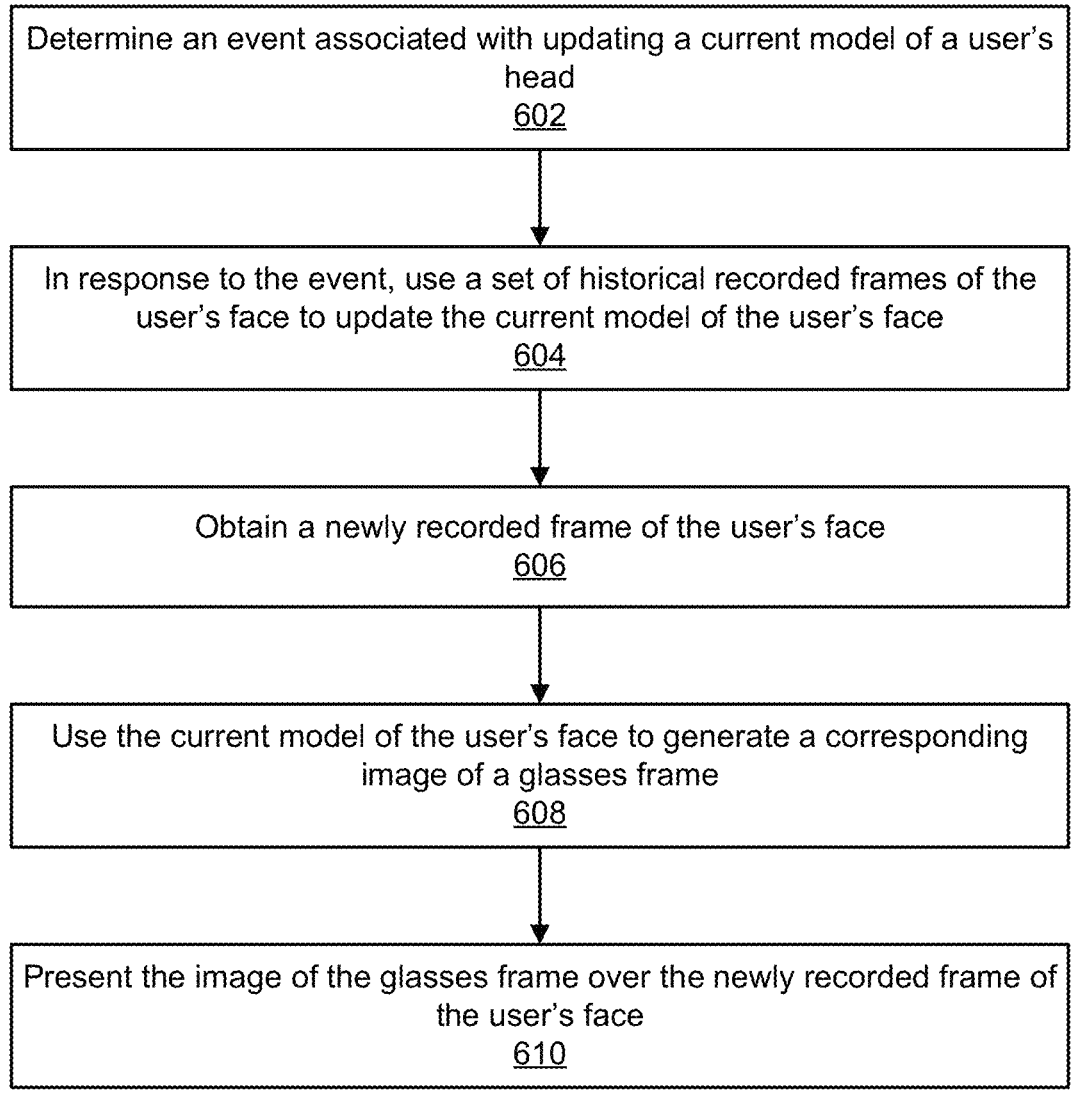
FIG. 6 is a flow chart illustrating an embodiment of a process for live fitting of glasses.

FIG. 6 is a flow chart illustrating an embodiment of a process for live fitting of glasses. This process may be performed as part of another process such as FIG. 4. This process may be implemented by system 100. In the example shown, the process begins by determining an event associated with updating a current model of a user's face (602).

The process uses a set of historical recorded frames of the user's face to update the current model of the user's face in response to the event (604). For example, the set of historical recorded frames of the user's face may be those obtained at 402 of FIG. 4 or images obtained prior to a current recording session.

The process obtains a newly recorded frame of the user's face (606). The process may obtain the newly recorded frame by instructing a camera on a device to capture images of a user. Feedback may be provided to the user via a user interface such as those shown in FIGS. 10-12 to instruct the user to move his or her head in order for desired images to be captured.

The process uses the current model of the user's face to generate a corresponding image of a glasses frame (608). An example process is further described in FIGS. 8A, 8B, and 9.

The process presents the image of the glasses frame over the newly recorded frame of the user's face (610). An example of presenting the image is 418 of FIG. 4.

The current model of the user's face can be updated when new information is available such as new facial landmarks or depth sensor data associated with recent historical images. In various embodiments, a predetermined number of poses is needed to generate a model of a desired density or accuracy. However, a user sometimes turns their head too quickly and a pose is not fully captured. When a pose has not been fully captured, the user will be prompted to return to a position in which the pose can be captured. As further described with respect to FIG. 12, feedback can be provided on a GUI or in another format (e.g., a sound or haptic feedback) to prompt the user to turn in a desired direction.

Figure 7:
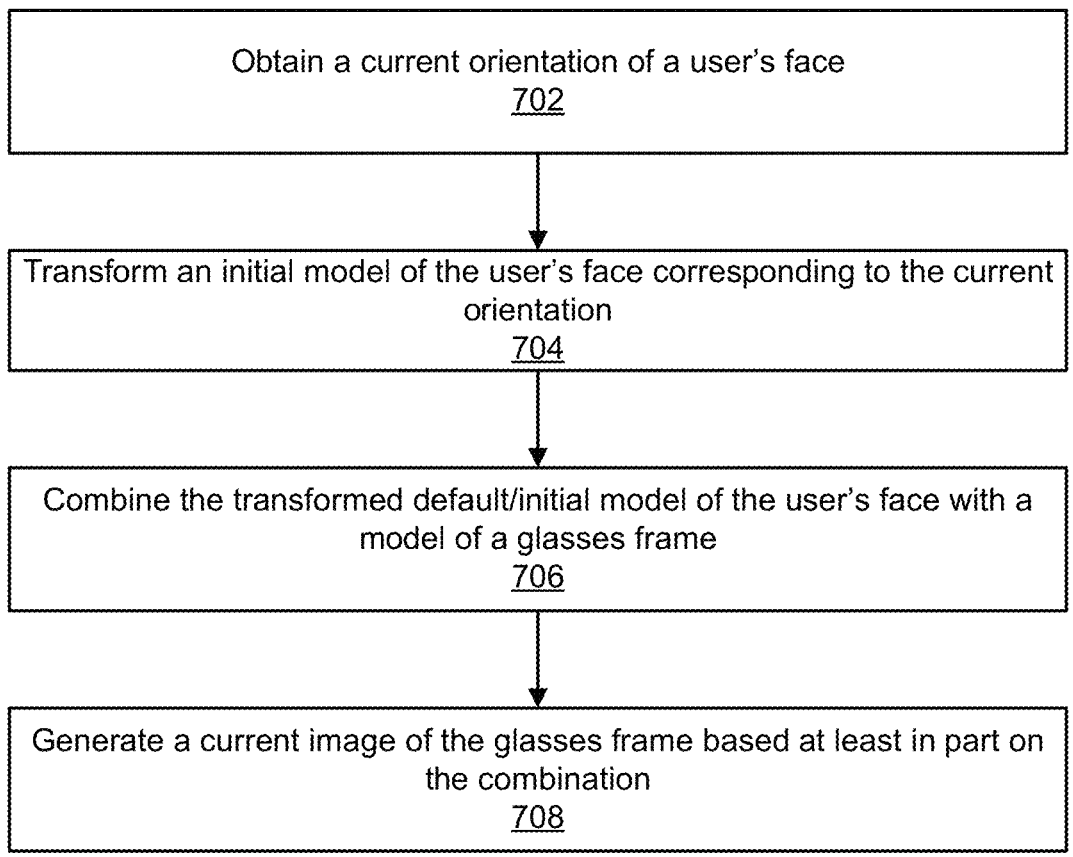
FIG. 7 is a flow chart illustrating an embodiment of a process for generating a corresponding image of glasses frames.

FIG. 7 is a flow chart illustrating an embodiment of a process for generating a corresponding image of glasses frames. This process may be performed as part of another process such as 608 of FIG. 6. This process may be implemented by system 100. For example, the process may be performed when a user provides additional images after an initial model of the user's face is formed.

In the example shown, the process begins by obtaining a current orientation of a user's face (702). An example of determining a current orientation is 404. In various embodiments, the current orientation can be determined based on a newly recorded frame of the user's face including depth sensor data. In various embodiments, the orientation can be obtained from a device. The orientation provided by the device or a third party can be used directly or further processed to improve the orientation.

The process transforms the current model of the user's face corresponding to the current orientation (704). A 3D model of the user's face can be oriented to correspond to the current orientation. Scaling can be performed to efficiently and accurately transform the current model of the user's face as further described herein with respect to FIGS. 8A, 8B, and 9.

The process combines the transformed model of the user's face with a model of a glasses frame (706). An example of combining the transformed model of the head with a model of a glasses frame is 412.

The process generates a current image of the glasses frame based at least in part on the combination (708). An example of combining the transformed model of the head with a model of a glasses frame is 414.

The process generates a current image of the glasses frame based at least in part on the combination of the transformed model of the head with a model of a glasses frame (708). In various embodiments, the current image of the glasses frame is a 2D image suitable to be displayed on the user's head to show the user trying on the glasses frame. The 2D image can be generated such that when it is combined with the user's face, artifacts and occlusions have been removed.

The following figures (FIGS. 8A, 8B, and 9) show some examples of determining scale using either a relatively coarse head model or a relatively finer head model.

FIG. 8A is a flow chart illustrating an embodiment of a process for scaling a head model using a relatively coarse model. This process may be performed as part of another process such as 704 of FIG. 7. This process may be implemented by system 100 using a coarse model such as the one generated by 206.

In various embodiments, the true scale and PD (pupillary distance) of a user's face can be determined. For example, the true scale and PD can be determined on iOS® devices from one or more RGB camera images, one or more true depth images, and 3D geometry provided by ARKit. The same concept can be also adapted to Android® devices or other platforms where depth images and calibration information for 3D geometry can be obtained.

The process begins by receiving a two-dimensional (2D) RGB image and a depth image (802). The 2D RGB can be included in a set of RGB images of the user's head. An example of the 3D depth image is a true depth image. In various embodiments, the process obtains the 2D RGB image and/or depth image via an API.

Given the 3D model of an object, the model space coordinates of the object can be mapped to 2D image space. One example mapping is:

$$[x,y,1]^T = P*V*M*[X,Y,Z,1]^T$$

where x, y are 2D coordinates, P, V, and M are the projection, view, and model matrices respectively and X, Y, and Z are the 3D model space coordinates.

The model matrix moves the coordinates in (scaleless) model space to the real world coordinate system. Then, the view matrix provides translation and rotation operations so that the object is represented in the camera coordinate system. When face tracking is turned on, ARKit provides a representation for the face in model space where the face is represented by a low resolution, inaccurate mesh (a few number of vertices). Additionally the P, V, and M matrices are also provided, hence a mapping between pixel coordinates and the model mesh vertices can be obtained. Given the P matrix (obtained from focal length and optical center), any point on the image can be represented in the camera coordinate system (real world dimensions) if the depth information for that point is available. For the devices that come with a depth sensor, the calibration is done so that the depth image is registered to the RGB image only with a difference in resolution in various embodiments. In some embodiments, there is no difference in resolution.

The process finds coordinates associated with a 2D feature in the 2D RGB image (804). An example of a 2D feature is an iris of an eye, so the coordinates are the iris coordinates. The 2D feature coordinates may be found using machine learning. The iris coordinates in 2D can be used to determine iris points in 3D, and the distance between iris points gives the pupillary distance. In various embodiments, using the example of ARKit by Apple®, the iris coordinates (x, y, z) are determined by using the ARKit for each of the left eye and right eye. This can be determined from device sensor information.

The process uses resolution mapping between the 2D RGB image and the depth image and the found 2D feature coordinates to determine 3D feature coordinates in the depth image (806). Once the iris points are determined on RGB image, the depth information can be obtained from a depth image (possibly with some additional processing in the neighborhood of iris points) and this depth value can be combined with focal length and optical center information from projection matrix to represent iris points in 3D coordinate system with real world dimensions.

The projection matrix has the following form (and can be obtained from ARKit):

$$\begin{bmatrix} sx & 0 & cx & 0 \\ 0 & sy & cy & 0 \\ 0 & 0 & -1.000001 & -0.000001 \\ 0 & 0 & -1 & 0 \end{bmatrix}$$

Given the projection matrix, iris coordinates in the depth image, depth value, and depth image resolution, the following equations can be used to represent iris points in a 3D coordinate system with real world dimensions.

$a$=depth_projection_matrix[0,0]

$c$=depth_projection_matrix[0,2]

$f$=depth_projection_matrix[1,1]

$g$=depth_projection_matrix[1,2]

$m$=depth_projection_matrix[2,2]

$n$=depth_projection_matrix[2,3]

$z$=depth_image[int(markers_depth_coords[0]),int (markers_depth_coords[1])]

$H,W$=depth_image_height,dept image_with $y\_clip = 1-(int(markers\_depth\_coords[0])/(H/2.0))$ $x\_clip = (int(markers\_depth\_coords[1])/(W/2.0))-1$ $Z = -z$ $X = (x\_clip*(-Z)-c*Z)/a$ $Y = (y\_clip*(-Z)-g*Z)/f$ The process determines real life dimensions feature pair distance in 2D space using the 3D feature coordinates (808). For example, the true PD can be determined using the 3D feature coordinates. The real life dimensions are useful for accurately showing the placement of glasses frames on the user's head.

FIG. 8B is a flow chart illustrating an embodiment of a process for scaling a head model using a relatively finer model. This process may be performed as part of another process such as 704 of FIG. 7. This process may be implemented by system 100 using a coarse model such as the one generated by 306. Compared with the process of FIG. 8A, a more accurate scale can be determined but may require more computational power.

Given a head-turn sequence (RGB image) and a single scale image (true depth and RGB), the scale for a 3D reconstruction of the head in 3D (accurate high resolution mesh—also called the "Ditto mesh") can be obtained. One approach is to project the iris points to the 3D head and scale the head using the 3D iris-to-iris distance. However, this would only use 2 points on the mesh and might not be accurate if there is an error in the unprojection or iris detection. Another approach is to use multiple feature points on the face, calculate pairwise distances on the unprojections (locations on 3D Ditto mesh) and pairwise distances obtained through 3D representation based on ARKit information. The scale ratio of the two distances corresponding to the same pair is expected to be constant across all pairs in various embodiments. This scale ratio can be estimated by using multiple pairs as follows or alternatively using the process described in FIG. 9.

The process begins by unprojecting 3D feature coordinates in a depth image to a 3D head model to obtain 3D feature coordinates using extrinsic information corresponding to an RGB image (812). An example of 3D feature coordinates is iris coordinates. An example of the 3D head model is the relatively fine model generated by model generator 306. Although not shown here, the process may previously receive input like the process of FIG. 8A by receiving a 3D mesh (model of the user's head) such as one generated by model generator 306, true depth (e.g., ARKit) information, and/or camera intrinsic information. For example, using camera extrinsics, the process obtains a left eye in a Ditto mesh (the 3D head model) using an unprojection defined in 3D coordinates in Ditto space. Similarly, a right eye can be obtained.

The process determines a first feature pair distance using the 3D feature coordinates (814). The first feature pair distance is based on the Ditto mesh. The first feature pair distance is a pairwise distance on location in the Ditto mesh model of the user's head.

The process determines a second feature pair distance using a true depth image (816). The second feature pair distance is based on ARKit information. The second feature pair distance is a pairwise distance obtained from the true depth information.

The process determines a scale coefficient as a ratio of the first feature pair distance and the second feature pair distance (818). For example, the first feature pair distance is compared (e.g., divided) by the second feature pair distance to obtain the scale coefficient (also called a scale ratio). Scale coefficients are expected to be constant, but if they are not exactly the same, an average can be taken. The scale coefficient can be used to determine the PD and true scale.

The use of ARKit and depth information to add scale to 3D reconstruction by using a single scale image (RGB+true depth) has been described. These concepts can be extended to provide a live try-on experience on true depth devices. Given a depth image, RGB image, projection matrix, and view matrix (camera extrinsics), a high accuracy mesh can be determined/obtained for the face (e.g., extending the current methods to known ones such as the Ditto 3D reconstruction algorithm). Then, given each new image (RGB and/or depth image plus extrinsics), the initial mesh and given extrinsics can be refined to provide an accurate live try-on or video try-on experience for the user.

FIG. 9 is a flow chart illustrating an embodiment of a process for scaling and generating a head model. This process may be performed as part of another process such as 704 of FIG. 7. This process may be implemented by system 100 using camera information such as the set of images and associated information of 504. This process is an alternative to the ones described in FIGS. 8A and 8B. In various embodiments, depth images and RGB images captured in addition to pose information provided by a framework such as ARKit are used to generate a head mesh with real life scale. One benefit is that existing information (pose, coarse head model) can be leveraged and built upon later by incorporating a video try on (offline processing)/improved live try on. This decreases processing time by eliminating the need to determine camera information and pose information.

The process begins by receiving one or more RGB images, one or more depth sensor images, pose information, and camera intrinsics (902). This information may be generated by devices that have depth sensors and via libraries provided by native frameworks such as ARKit. For example, ARKit provides a coard head model and pose information, which are extrinsics for the images. Cameras with depth sensors may generate depth images that correspond to standard RGB images. Camera intrinsics refer to information such as focal length.

The process uses camera intrinsics to generate a 3D point in real life scale for each point in each depth sensor image (904). The camera intrinsics provide information about the camera's properties, which can be used to map a point from a depth sensor image to a 3D point in real life scale. The process of FIG. 8A (or a portion thereof) can be applied to generate 3D points by processing every point/pixel in the image (not necessarily just the iris points).

The process uses pose information to merge 3D points from images into a point cloud with real life scale (906). The point cloud represents a general area or structure for a 3D head model.

The process uses historical head scans from storage to generate a model of the user's face with real life scale that matches the shape of the point cloud (908). The generated model is clean and accurate to the user's head. In order to obtain a clean and accurate user's head model, historical scans are registered to the 3D point cloud. The historical head scans can be a statistical model aggregated by using a set of historical scans.

Scaling (e.g., the result of the process of FIG. 8A, 8B, or 9) can be used to generate or modify the size of the 3D head model (Ditto mesh) in 3D space. The scaled head can be used to generate a 2D image of a selected glasses frame (e.g., used by 608).

The following figures show some graphical user interfaces (GUIs). The GUIs can be rendered on a display of the client device 104 of FIG. 1 corresponding to various steps of the live fitting process.

FIG. 10 illustrates an example of a frame fit graphical user interface obtained in some embodiments. This GUI conveys how well a glasses frame fits a user's face. When glasses are initially augmented onto the face (prior to collecting sufficient image data about the user's face) there might not be enough facial data gathered to accurately ascertain how a particular pair of glasses will fit various areas (face width, optical center, nose bridge, and temple).

As the user turns from side to side, facial data is collected and processed to obtain a 3D understanding of the head (build the 3D model of the user's face) in order to accurately assess fit across the areas.

As shown, the GUI conveys one or more of the following:
Highlight facial elements for fit (bridge, temple, etc.)
Indicate if a fit for a particular facial area is being processed, and/or indicate the degree of processing completed
Once fit is processed a score (e.g. red, yellow, green; represented here by a grayscale gradient) is display to indicate the degree to which the glasses fit (is suitable for) a particular facial element FIG. 11 illustrates an example of a frame scale graphical user interface obtained in some embodiments. This GUI conveys the scale of a glasses frame relative to a user's face. When glasses are initially augmented onto the face there might not be enough facial data gathered to accurately ascertain scale (the relative size of the frames to the user's face). In various embodiments, the glasses are initially displayed as "ideally" sized so as to appear to fit the user's face (1100) even if the frames may be too small or too large. The true scale of the glasses can be determined after additional user face images are obtained (1102). An example of how to determine scale/a true size of a user's face is described with respect to FIGS. 8A, 8B, and 9. Here, while the user moves his head from left to right (dashed lines), the glasses follow the user's face so that the user experience is like looking in a mirror. As the user turns and more facial data is collected the glasses scale to the correct size and sit/fit more accurately on the face (1104). Here, the frames turn out to be larger than the initial "ideal" size.

FIG. 12 illustrates an example of a desired and captured facial angles graphical user interface obtained in some embodiments. This GUI conveys the facial angles that have been successfully captured and/or facial angles desired to be captured (e.g., desired angles are not yet fully processed). When glasses are initially augmented onto the face there might not be enough facial data gathered to accurately ascertain how a particular pair of glasses will fit key areas (face width, optical center, nose bridge, and temple). As the user turns from side to side, facial data is collected and processed to obtain a 3D understanding of the head (build the 3D model of the user's face) in order to accurately assess fit across the areas. Side turns capture a clip (e.g., video frames) that will in turn allow the user to see themselves at key angles when frames are augmented.

The GUI conveys one or more of the following:

In a first portion, display an image of the user's face with glasses frames that the user is trying on. In a second portion (strip on the bottom in this example), captured and desired facial angles.

An indicator showing a desired angle has been captured but is still processing (1200). Initially, a forward-facing image is desired so the indicator (circular arrow) shows that this is the image being captured. Once the image is captured, the indicator is replaced by the captured image (1202).

An initial (front-facing) image of the user without glasses in a strip (1202)

Guidance within the strip, prompting the user to turn from side to side or in one direction or another direction (e.g., left 1204-1208 or right 1210)

Images of the user without glasses when a desired angle is processed as shown in the bottom strip in 1202-1210.

Figure 13:
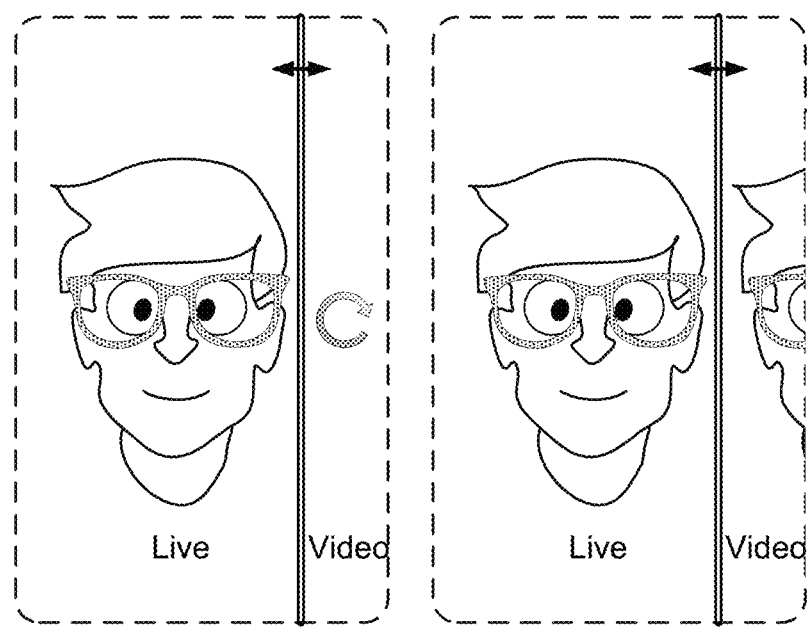
FIG. 13 illustrates an example of a split screen graphical user interface obtained in some embodiments.

FIG. 13 illustrates an example of a split screen graphical user interface obtained in some embodiments. This GUI allows a user to see both live try-on on one portion of the screen and video try-on on another portion of the screen. In various embodiments, the default display is a live try-on (frames augmented on face in real-time). When the user turns to capture needed angles the images are processed for the video-based try-on. A split screen is displayed to show processing. When processing is complete, the video try-on becomes visible. The user can drag a slider to switch between the live try-on and video try-on.

Figure 14:
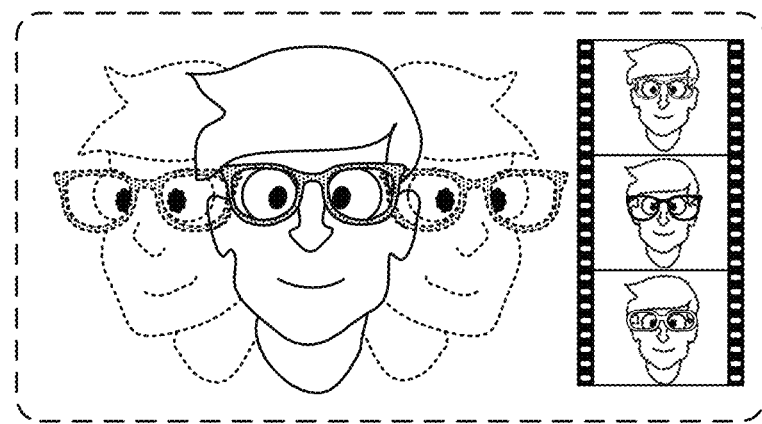
FIG. 14 illustrates an example of a graphical user interface for displaying various glasses frames obtained in some embodiments.

FIG. 14 illustrates an example of a graphical user interface for displaying various glasses frames obtained in some embodiments. This GUI can be used for live try-on and/or video try-on.

For example, for live try-on, the initial screen is a live try-on (frames augmented on face in real-time). The strip shows other selected or recommended frames also as live try-ons. In various embodiments, the main try-on and strip try-ons are the same live feeds but feature different frames. The user can swipe the strip up and down to see different frames.

For example, for video try-on, the initial screen is a live try-on (frames augmented on face in real-time). The strip shows other selected or recommended frames as video try-ons. Once the try-on has been processed the strip appears. Each video try-on can be interacted with independently. The user can swipe the strip up and down to see different frames.

Figure 15:
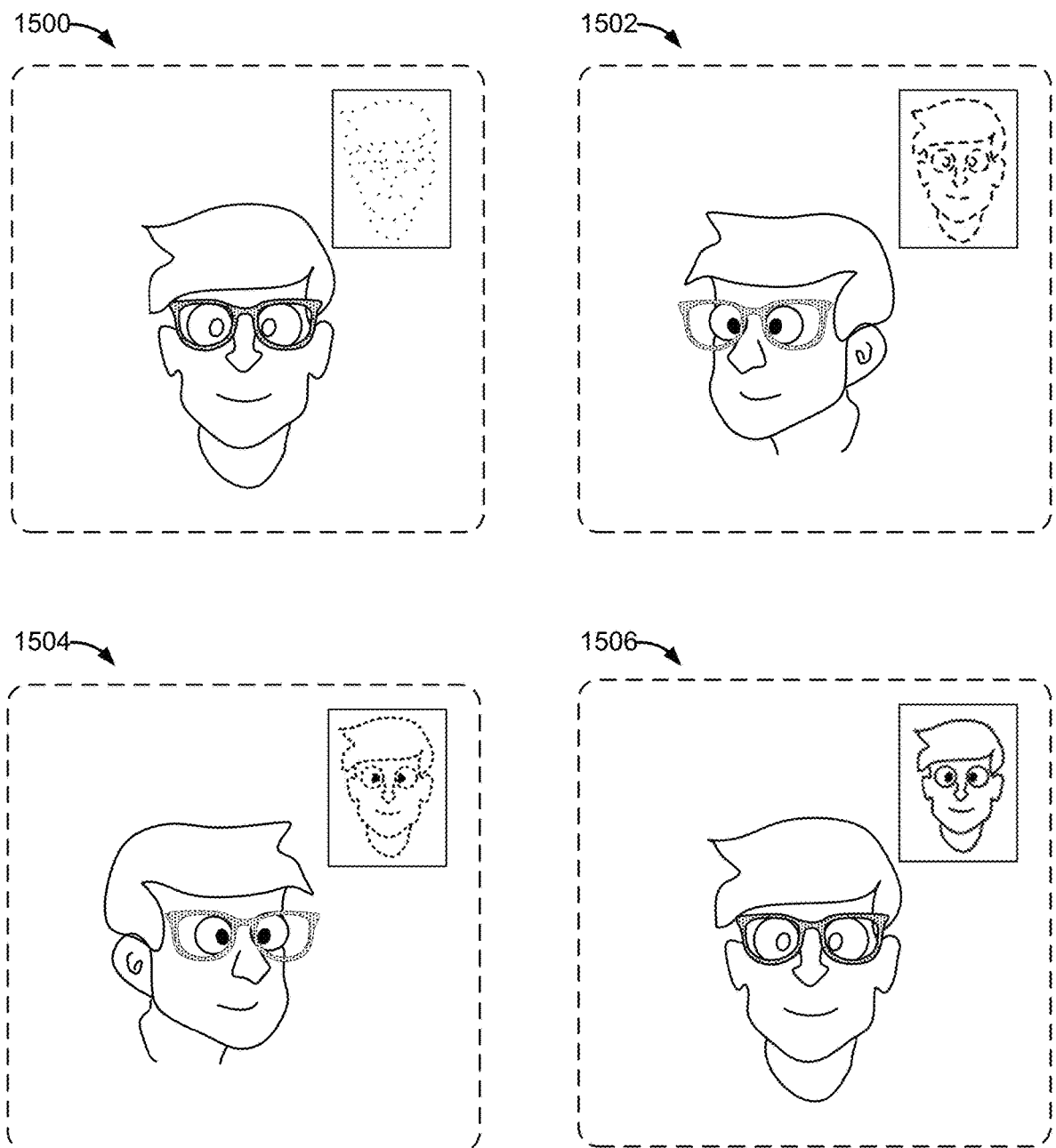
FIG. 15 illustrates an example of a graphical user interface with an inset obtained in some embodiments.

FIG. 15 illustrates an example of a graphical user interface with an inset obtained in some embodiments. When glasses are initially augmented onto the face there might not be enough facial data gathered to accurately ascertain how a particular pair of glasses will fit key areas (face width, optical center, nose bridge, and temple). As the user turns from side to side facial data is collected and processed to obtain a 3D understanding of the head (build the 3D model of the user's face) in order to accurately assess fit across the areas.

Additionally the side turns capture a clip (video frames) that will in turn allow the user to see themselves at key angles when frames are augmented.

The GUI conveys one or more of the following:

The initial screen is a live try-on (frames augmented on face in real-time) (1500)

The inset picture shows the processed video try-on to represent the extent to which the needed frames have been received and processed As the video try-on is processed the inset picture becomes clearer (progression from 1500-1506)

The techniques disclosed herein have many advantages over conventional live try-on products including the ability to save various images and sequences of images from the live virtual mirror session with different poses of the head and face wearing different glasses. The techniques disclosed herein provide the ability to create sequences of images that represent natural movement of the user wearing different frames. In various embodiments, fitting information, (sequences of) images, and the like are saved from the session and used to show additional different types of frames to the user even after the live session has ended.

The techniques disclosed herein can be integrated with other types of video try-on for glasses processes/systems. This video try-on approach has proven to be a very useful way for people who are interested in buying new glasses to see how they would look in different pairs of glasses. In this use case, the user records the images and uploads them for analysis, and then the recorded images are saved and used to create a 3D reconstruction of the user's face. These images are saved for later use, and the 3D model of the face is saved for subsequent render requests utilizing a variety of different glasses frames as requested by the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
determine an event associated with updating a current model of a user's face;
in response to the event, use a set of historical recorded frames of the user's face to update the current model of the user's face;
obtain a newly recorded frame of the user's face;
use the current model of the user's face to generate a corresponding image of a glasses frame;
determine a set of computed bridge points, wherein determining the set of computed bridge points comprises:

determining a face normal vector using at least three points from the current model of the user's face;
determining a bridge shift value based on two internal eyebrow points and two internal eye corners from the current model of the user's face; and
determining the set of computed bridge points based on the face normal vector and the bridge shift value;
present the image of the glasses frame over the newly recorded frame of the user's face in an initial placement based on the set of computed bridge points; and
modify the initial placement of the glasses frame over the newly recorded frame of the user's face based on a determined set of morphed nose curve points, the morphed nose curve points determined by moving a predetermined set of points along a nose curve of a generic face model to match corresponding locations on the current model of the user's face; and
a memory coupled to the processor and configured to provide the processor with instructions.

2. The system of claim 1, wherein the event is based at least in part on: an elapsed time, a number of newly recorded frames meeting a threshold, or a detected orientation of the user's face.

3. The system of claim 1, wherein the set of historical recorded frames of the user's face includes those recorded frames within a time threshold.

4. The system of claim 1, wherein the current model of the user's face is obtained from depth sensor data collected by a device.

5. The system of claim 1, wherein the current model of the user's face is generated based at least in part on faces of historical users.

6. The system of claim 1, further comprising updating the current model of the user's face including by:
obtaining a current orientation of a user's face;
transforming the current model of the user's face corresponding to the current orientation;
combining the transformed model of the user's face with a model of a glasses frame; and
generating a current image of the glasses frame based at least in part on the combination of the transformed model of the user's face with a model of a glasses frame.

7. The system of claim 6, wherein transforming the current model of the user's face corresponding to the current orientation includes scaling user's face including by:
receiving a two-dimensional (2D) RGB image and a depth image;
finding coordinates associated with a 2D feature in the 2D RGB image;
use resolution mapping between the 2D RGB image and the depth image and the found 2D coordinates to determine 3D feature coordinates in the depth image; and
determine real life dimensions feature pair distance in 2D space using the 3D feature coordinates.

8. The system of claim 6, wherein transforming the current model of the user's face corresponding to the current orientation includes scaling user's face including by:
receiving a two-dimensional (2D) RGB image and a depth image;
unprojecting 3D feature coordinates in the depth image to a 3D head model to obtain 3D feature coordinates using extrinsic information corresponding to a RGB image;
determining a first feature pair distance using the 3D feature coordinates;
determining a second feature pair distance using the depth image; and
determining a scale coefficient as a ratio of the first feature pair distance and the second feature pair distance.

9. The system of claim 6, wherein transforming the current model of the user's face corresponding to the current orientation includes scaling user's face including by:
receiving one or more RGB images, one or more depth sensor images, pose information, and camera intrinsics;
for each point in each depth sensor image, using camera intrinsics to generate a 3D point in real life scale;
using pose information to merge 3D points from images into a point cloud with real life scale;
using historical head scans from storage to generate a model of the user's face with real life scale that matches the shape of the point cloud; and
using the generated model of the user's face to generate a corresponding image of a glasses frame.

10. The system of claim 1, further comprising a camera configured to record frames of the user's face, wherein the camera includes at least one depth sensor.

11. The system of claim 1, wherein presenting the image of the glasses frame over the newly recorded frame of the user's face includes rendering the image of the glasses frame over the newly recorded frame of the user's face in a graphical user interface.

12. The system of claim 1, wherein obtaining a newly recorded frame of the user's face includes displaying feedback to the user regarding at least one of captured facial angles and facial angles that are not yet fully processed.

13. The system of claim 1, wherein the processor is further configured to present information about a degree of fit to at least one area of the user's face.

14. The system of claim 1, wherein obtaining a newly recorded frame of the user's face and presenting the image of the glasses frame over the newly recorded frame of the user's face is performed substantially simultaneously.

15. The system of claim 1, wherein the processor is further configured to present an image of the glasses frame over a previously recorded frame of the user's face.

16. The system of claim 15, wherein the image of the glasses frame over a previously recorded frame of the user's face and the image of the glasses frame over a newly recorded frame of the user's face are presented side by side.

17. The system of claim 1, wherein the processor is further configured to:
receive user selection of a specific glasses frame from among a selection of glasses frames; and
present the image of the specific glasses frame over the newly recorded frame of the user's face.

18. The system of claim 1, wherein the processor is further configured to output progress of obtaining a newly recorded frame of the user's face.

19. A system, comprising:
a processor configured to:
obtain a set of images of a user's head;
determine an initial orientation of the user's head;
obtain an initial model of the user's head;
transform the initial model of the user's head corresponding to the initial orientation;
receive a user selection of a glasses frame;
determine a set of computed bridge points;
determine a vertical shift;
adjust the set of computed bridge points based on the vertical shift;
combine the transformed model of the user's head with a model of the glasses frame based on the adjusted set of computed bridge points, the computed bridge points determined by determining a normal set of bridge points of a generic face model and adjusting a vertex of the bridge points to match corresponding locations on the current model of the user's head;

generate a set of points in 3D by selecting vertices on the initial model;

generate a nose curve by fitting a plane to the set of points in 3D;

adjust the combination of the transformed model of the user's head with the model of the glasses frame based on the nose curve;

generate an image of the glasses frame based at least in part on the combination of the transformed model of the user's head with the model of the glasses frame; and provide a presentation including by overlaying the image of the glasses frame over at least one image of the set of images of the user's head; and a memory coupled to the processor and configured to provide the processor with instructions.

20. A system, comprising:

a processor configured to:

receive one or more RGB images, one or more depth sensor images, pose information, and camera intrinsics;

for each point in each depth sensor image, use camera intrinsics to generate a 3D point in real life scale;

use pose information to merge 3D points from images into a point cloud with real life scale;

use historical head scans from storage to generate a 3D head model with real life scale that matches the shape of the point cloud;

determine a set of computed bridge points, wherein determining the set of computed bridge points comprises:

determining a face normal vector using at least three points from the 3D head model;

determining a bridge shift value based on two internal eyebrow points and two internal eye corners from the 3D head model; and determining the set of computed bridge points based on the face normal vector and the bridge shift value;

use the generated 3D head model and the set of computed bridge points to generate an initial corresponding image of a glasses frame; and modify the initial corresponding image of the glasses frame based on a determined set of morphed nose curve points, the morphed nose curve points determined by moving a predetermined set of points along a nose curve of a generic face model to match corresponding locations on the 3D head model; and a memory coupled to the processor and configured to provide the processor with instructions.

21. A method, comprising:

determining an event associated with updating a current model of a user's face;

in response to the event, using a set of historical recorded frames of the user's face to update the current model of the user's face;

obtaining a newly recorded frame of the user's face;

using the current model of the user's face to generate a corresponding image of a glasses frame;

determining a set of computed bridge points, wherein determining the set of computed bridge points comprises:

determining a face normal vector using at least three points from the current model of the user's face;

determining a bridge shift value based on two internal eyebrow points and two internal eye corners from the current model of the user's face; and determining the set of computed bridge points based on the face normal vector and the bridge shift value;

presenting the image of the glasses frame in an initial position over the newly recorded frame of the user's face based on the set of computed bridge points; and modifying the presented image of the glasses frame over the newly recorded frame of the user's face from the initial position based on a determined set of morphed nose curve points, the morphed nose curve points determined by moving a predetermined set of points along a nose curve of a generic face model to match corresponding locations on the current model of the user's face.

22. A computer program product embodied in a non-transitory computer readable medium and comprising computer instructions for:

determining an event associated with updating a current model of a user's face;

in response to the event, using a set of historical recorded frames of the user's face to update the current model of the user's face;

obtaining a newly recorded frame of the user's face;

using the current model of the user's face to generate a corresponding image of a glasses frame;

determining a set of computed bridge points, wherein determining the set of computed bridge points comprises:

determining a face normal vector using at least three points from the current model of the user's face;

determining a bridge shift value based on two internal eyebrow points and two internal eye corners from the current model of the user's face; and determining the set of computed bridge points based on the face normal vector and the bridge shift value; and presenting the image of the glasses frame in an initial position over the newly recorded frame of the user's face based on the set of computed bridge points; and modifying the presented image of the glasses frame over the newly recorded frame of the user's face from the initial position based on a determined set of morphed nose curve points, the morphed nose curve points determined by moving a predetermined set of points along a nose curve of a generic face model to match corresponding locations on the current model of the user's face.

* * * * *